US012354441B2

(12) United States Patent
Kennedy et al.

(10) Patent No.: US 12,354,441 B2
(45) Date of Patent: Jul. 8, 2025

(54) ADDITIONAL AWARDS ASSOCIATED WITH GUARANTEED SYMBOL GENERATIONS

(71) Applicant: IGT, Las Vegas, NV (US)

(72) Inventors: Timothy Kennedy, Reno, NV (US); Robin Hare, Reno, NV (US); Justin Valvo, Reno, NV (US)

(73) Assignee: IGT, Las Vegas, NV (US)

( * ) Notice: Subject to any disclaimer, the term of this patent is extended or adjusted under 35 U.S.C. 154(b) by 471 days.

(21) Appl. No.: 17/955,078

(22) Filed: Sep. 28, 2022

(65) Prior Publication Data

US 2024/0105012 A1 Mar. 28, 2024

(51) Int. Cl.
*G07F 17/32* (2006.01)

(52) U.S. Cl.
CPC ...... *G07F 17/3267* (2013.01); *G07F 17/3211* (2013.01); *G07F 17/3244* (2013.01)

(58) Field of Classification Search
CPC ............. G07F 17/3267; G07F 17/3211; G07F 17/3244; G07F 17/3258
USPC ............................................................ 463/20
See application file for complete search history.

(56) References Cited

U.S. PATENT DOCUMENTS

| | | | | |
|---|---|---|---|---|
| 7,753,769 | B2 | 7/2010 | Gomez et al. | |
| 8,425,303 | B2 | 4/2013 | Kennedy et al. | |
| 8,591,313 | B2 | 11/2013 | Gomez et al. | |
| 9,330,527 | B2 | 5/2016 | Collette et al. | |
| 9,940,775 | B2 | 4/2018 | Eaton et al. | |
| 10,388,117 | B2 | 8/2019 | Harrelson et al. | |
| 11,282,340 | B2 * | 3/2022 | Kennedy | G07F 17/3267 |
| 12,236,755 | B2 * | 2/2025 | Kennedy | G07F 17/3213 |
| 2008/0108411 | A1 * | 5/2008 | Jensen | G07F 17/3286 463/20 |
| 2008/0113779 | A1 | 5/2008 | Cregan | |
| 2009/0075722 | A1 | 3/2009 | Louie et al. | |
| 2009/0233691 | A1 | 9/2009 | Yoshizawa | |
| 2012/0021816 | A1 | 1/2012 | Aoki | |
| 2013/0296010 | A1 * | 11/2013 | Berman | G07F 17/3293 463/13 |
| 2017/0372558 | A1 | 12/2017 | You et al. | |
| 2019/0088077 | A1 | 3/2019 | Zehetner | |
| 2020/0168053 | A1 * | 5/2020 | Berman | G07F 17/3262 |

* cited by examiner

*Primary Examiner* — Michael A Cuff
(74) *Attorney, Agent, or Firm* — Neal, Gerber & Eisenberg, LLP

(57) ABSTRACT

Gaming systems and methods that maintain a progressive award associated with a guaranteed minimum quantity of generations of a designated symbol, certain of which are associated with an additional award.

20 Claims, 12 Drawing Sheets

ADDITIONAL AWARDS ASSOCIATED WITH GUARANTEED SYMBOL GENERATIONS

BACKGROUND

In various embodiments, the systems and methods of the present disclosure maintain a progressive award associated with a guaranteed minimum quantity of generations of a designated symbol, certain of which are associated with an additional award.

Gaming machines may provide players awards in primary games. Gaming machines generally require the player to place a wager to activate the primary game. The award may be based on the player obtaining a winning symbol or symbol combination and on the amount of the wager.

BRIEF SUMMARY

In certain embodiments, the present disclosure relates to a gaming system including a processor, and a memory device that stores a plurality of instructions. When executed by the processor, the instructions cause the processor to cause a display, by a display device, of a first progressive award including a first quantity of occurrences of a designated symbol, the first quantity of occurrences of the designated symbol including a first occurrence of the designated symbol associated with a first additional award. When executed by the processor responsive to an occurrence of a first progressive award triggering event associated with a play of a first game, the instructions cause the processor to determine a first total award based on a guarantee of a generation, during the play of the first game, of at least the first quantity of occurrences of the designated symbol, and the first additional award, and cause a display, by the display device, of the first total award.

In certain embodiments, the present disclosure relates to a gaming system including a processor, and a memory device that stores a plurality of instructions. When executed by the processor, the instructions cause the processor to cause a display, by a display device, of a progressive award including a first quantity of guaranteed occurrences of a designated symbol, at least one occurrence of the first quantity of guaranteed occurrences of the designated symbol being associated with a first additional award. When executed by the processor responsive to an occurrence of a triggering event, the instructions cause the processor to cause a display, by the display device, of a first plurality of plays of a game, wherein at least the first quantity of guaranteed occurrences of the designated symbol is guaranteed to be generated over the first plurality of plays of the game, and a first total award over the first plurality of plays of the game includes the first additional award. When executed by the processor following the first plurality of plays of the game, the instructions cause the processor to reset the first quantity of guaranteed occurrences of the designated symbol to a reset quantity of guaranteed occurrences of the designated symbol, at least one occurrence of the reset quantity of guaranteed occurrences of the designated symbol being associated with a second additional award, and cause a display, by the display device, of the progressive award including the reset quantity of guaranteed occurrences of the designated symbol. At least the reset quantity of guaranteed occurrences of the designated symbol is guaranteed to be generated over a second plurality of plays of the game, and a second total award over the second plurality of plays of the game includes the second additional award.

In certain embodiments, the present disclosure relates to a gaming system including a processor, and a memory device that stores a plurality of instructions. When executed by the processor for a play of a game associated with a triggering of a progressive award including a quantity of guaranteed occurrences of a designated symbol, the quantity of guaranteed occurrences including a first guaranteed occurrence of the designated symbol being associated with a first additional award, and a second guaranteed occurrence of the designated symbol being associated with a second additional award, the instructions cause the processor to cause a display, by a display device, of a plurality of symbols at a plurality of symbol display positions, the plurality of symbols including at least the quantity of guaranteed occurrences of the designated symbols, and cause a display, by the display device, of a total award based, at least in part, at least one of the first additional award and the second additional award.

Additional features are described herein, and will be apparent from the following Detailed Description and the figures.

DETAILED DESCRIPTION

Guaranteed Symbol Generation

Figure 1A:
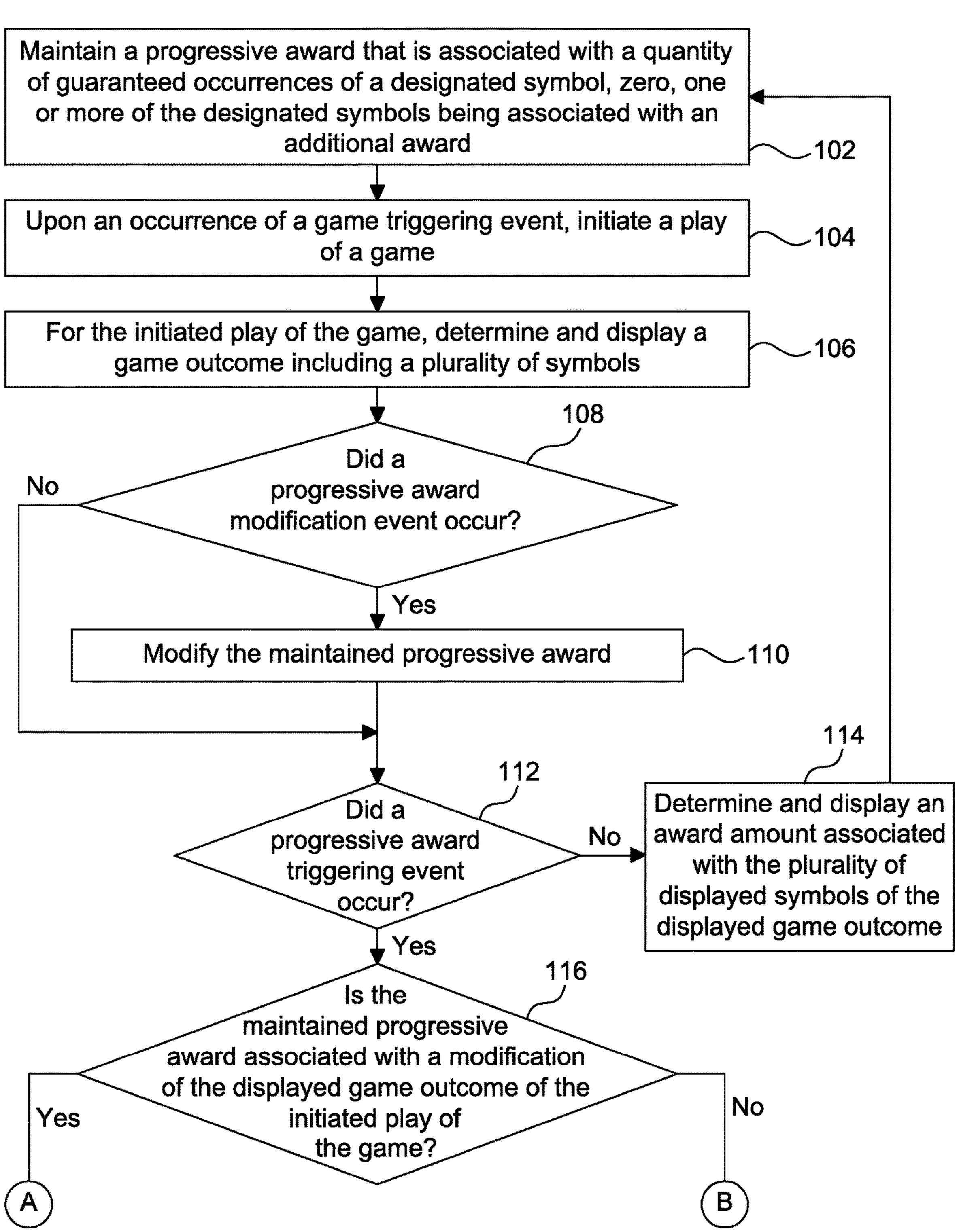
FIGS. 1A and 1B (collectively "FIG. 1") are flow charts of an example process of one embodiment of the present disclosure illustrating the operation of a gaming system which employs a progressive award associated with a quantity of guaranteed occurrences of a designated symbol, certain of which are associated with an additional award.

In various embodiments, the present disclosure relates generally to gaming systems and methods that maintain a progressive award associated with a guaranteed minimum quantity of generations of a designated symbol for one or more plays of a game, certain of such designated symbols being associated with an additional award.

Specifically, in certain embodiments, the gaming system maintains a progressive award that is associated with a quantity of guaranteed occurrences of a designated symbol. In these embodiments, in addition to or in lieu of any features or functionality associated with one or more of the designated symbols, such designated symbols are associated with an additional award, such as a value, available in association with a generation of that designated symbol. For example, each occurrence of the designated symbol may or may not qualify as a designated value symbol associated with a value separately providable by the gaming system.

In operation of these embodiments, upon a modification event associated with the progressive award, the gaming system modifies the quantity of guaranteed occurrences of the designated symbol associated with that progressive award. For example, the gaming system maintains a progressive award associated with a quantity of wild symbols (certain of which are wild value symbols associated with a static value) that are guaranteed to be generated upon a triggering event. In this example, upon a progressive award increment event, the gaming system adds another wild symbol (which may or may not be associated with a static value) to the progressive award.

In addition to dynamically increasing the quantity of guaranteed occurrences of the designated symbol of the progressive award, upon an occurrence of a triggering event, the gaming system utilizes the quantity of guaranteed occurrences of the designated symbol associated with the progressive award. In these embodiments, during a first period of time, the gaming system accumulates designated symbols in association with a progressive award and during a second period of time, the gaming system deploys such accumulated designated symbols in association with an awarding of the progressive award.

In certain embodiments, the gaming system utilizes the quantity of guaranteed occurrences of the designated symbol associated with the progressive award to modify part of a previously triggered play of a game such that the current quantity of the designated symbol associated with that progressive award are employed in association with a previously triggered play of a game. For example, if a triggering event occurs in association with a current play of a game and when the triggering event occurs, the progressive award is associated with a first quantity of wild symbols (certain of which qualify as wild value symbols additionally associated with a static value), the gaming system adds the first quantity of wild symbols to the current play of the game, such as by modifying one or more displayed non-wild symbols to wild symbols, adding static values to displayed wild symbols and/or compounding static values from multiple wild value symbols added to the same symbol display position. In this example, whether a wild symbol from the first quantity of wild symbols is used to modify a displayed non-wild symbol to a wild symbol, add a static value to a displayed wild symbol and/or add a static value to an existing value associated with a displayed wild symbol, the first quantity of wild symbols are fully utilized in association with the current play of the game. In these embodiments, following the modification of part of a previously triggered play of a game by distributing the current quantity of the designated symbol associated with the progressive award, the gaming system determines a total award based on any formed winning symbol combinations and any additional awards associated with any designated symbols. For example, for the current play of the game, the gaming system determines a total award based on any awards associated with any formed symbol combinations (which may or may not utilize the individual wild symbols of the first quantity of wild symbols added to the play of the game), and any static values displayed in association with any wild value symbols.

In certain other embodiments, the gaming system utilizes the quantity of guaranteed occurrences of the designated symbol associated with the progressive award for a sequence of a plurality of plays of a game such that the quantity of the designated symbol associated with the progressive award are guaranteed to be generated over the course of an ensuing plurality of plays of a game. For example, if a triggering event occurs in association with a play of a game and when the triggering event occurs, the award is associated with a second quantity of wild symbols (certain of which qualify as wild value symbols additionally associated with a static value), the gaming system triggers a free spin game having a quantity of free spins. Over the course of the quantity of free spins, at least the second quantity of wild symbols are guaranteed to be employed to modify a displayed non-wild symbol to a wild symbol, add a static value to a displayed wild symbol and/or add a static value to an existing value associated with a displayed wild symbol. In this example, for each individual free spin of the quantity of free spins (and/or for the collective quantity of free spins), the gaming system determines a total award based on any awards associated with any formed symbol combinations (which may or may not utilize the individual wild symbols of the second quantity of wild symbols added to that free spin), and any static values displayed in association with any wild value symbols.

Such a configuration of utilizing guaranteed quantities of designated symbols (which may or may not be individually associated with an additional award to further enhance the total award available) for one or more plays of a game introduces an additional aspect of randomness via the employment of multiple random determinations to determine one or more awards. For example, the gaming system of the present disclosure utilizes one or more of the randomness of the quantity of the designated symbol guaranteed to be utilized, the randomness in how and when such designated symbols are utilized, and/or the randomness of where such wild symbols are displayed to potentially add a compounding effect on any associated additional awards, in how the gaming system interfaces with users. Such additional randomness further alters the volatility of the gaming system and thus alters how the gaming system operates from one occurrence of a triggering event to another occurrence of the triggering event.

While certain embodiments described below are directed to utilizing a quantity of guaranteed occurrences of a designated symbol (which may or may not be associated with an additional award) in association with one or more plays of a secondary game, such as a bonus game, it should be appreciated that such embodiments may additionally or alternatively be employed in association with utilizing a quantity of guaranteed occurrences of a designated symbol (which may or may not be associated with an additional award) in association with one or more plays of a primary game, such as a wagering game. Additionally, while certain embodiments described below are directed to utilizing a quantity of guaranteed occurrences of a designated symbol (which may or may not be associated with an additional award) in association with a plurality of reels, it should be appreciated that such embodiments may additionally or alternatively be employed in association with utilizing a quantity of guaranteed occurrences of another designated game element (which may or may not be associated with an additional award), such as, but not limited to, utilizing a quantity of guaranteed occurrences of a designated playing card (which may or may not be associated with an additional award), utilizing a quantity of guaranteed occurrences of a designated keno number (which may or may not be associated with an additional award), or utilizing a quantity of guaranteed occurrences of a designated bingo element (which may or may not be associated with an additional award).

Moreover, while certain embodiments described below are directed to the gaming system utilizing a quantity of guaranteed occurrences of a designated symbol (which may or may not be associated with an additional award) that are displayed by an electronic gaming machine ("EGM") such as a slot machine, a video poker machine, a video lottery terminal, a terminal associated with an electronic table game, a terminal associated with a live table game, a video keno machine, a video bingo machine and/or a sports betting terminal that offers sports betting opportunities, it should be appreciated that such embodiments may additionally or alternatively be employed in association with the gaming system utilizing a quantity of guaranteed occurrences of a designated symbol (which may or may not be associated with an additional award) that are displayed by a personal gaming device (such as desktop computers, laptop computers, tablet computers or computing devices, personal digital assistants, mobile phones, and other mobile computing devices that offer plays of wagering games (and in certain instances, sports betting opportunities)), any suitable slot machine interface board which is in communication with an EGM, and/or any suitable combination of a server operating with an EGM, a slot machine interface board of an EGM and/or a personal gaming device.

Figure 1B:
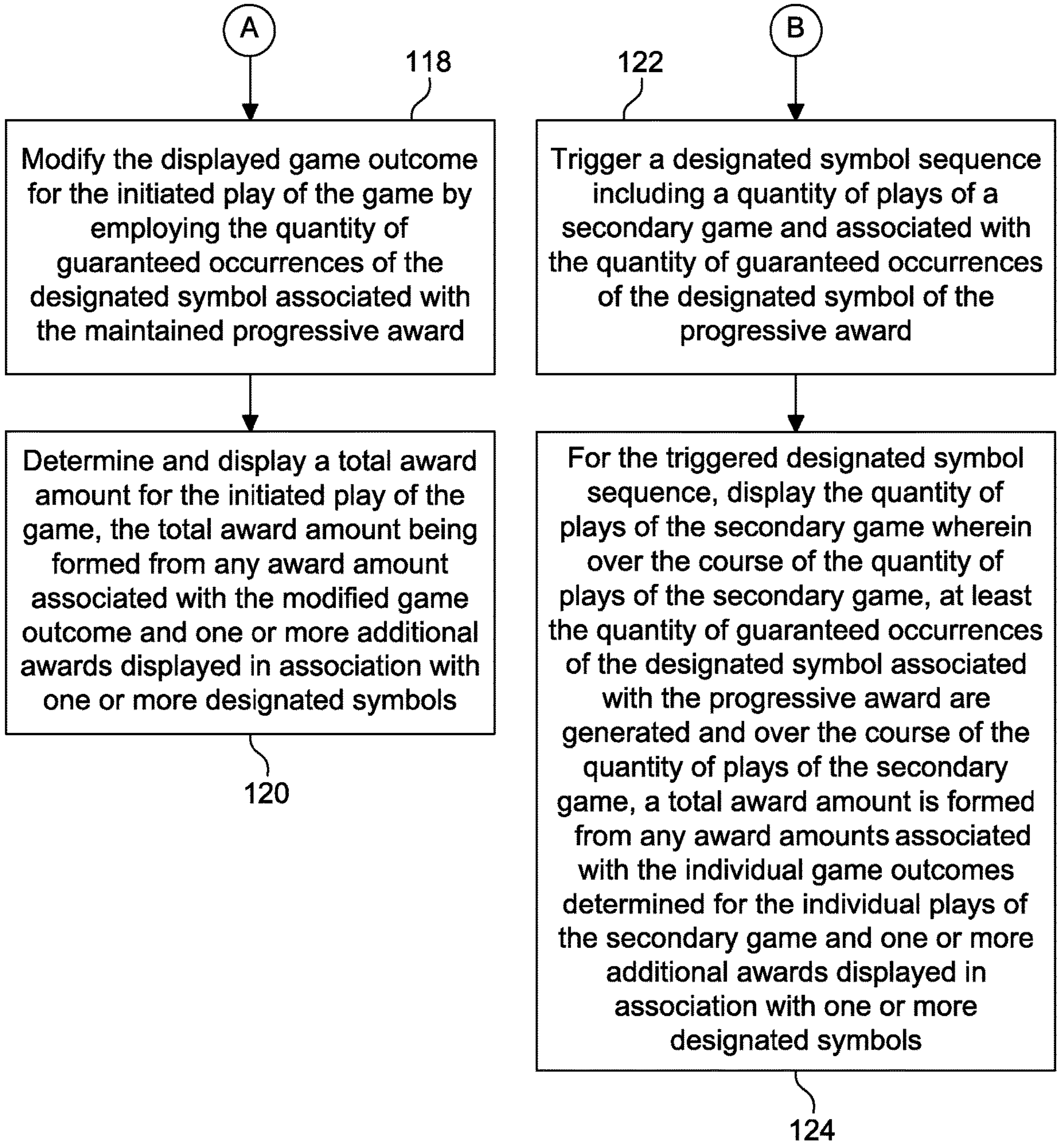

FIG. 1 is a flowchart of an example process or method of operating the gaming system of the present disclosure. In various embodiments, the process is represented by a set of instructions stored in one or more memories and executed by one or more processors. Although the process is described with reference to the flowchart shown in FIG. 1, many other processes of performing the acts associated with this illustrated process may be employed. For example, the order of certain of the illustrated blocks or diamonds may be changed, certain of the illustrated blocks or diamonds may be optional, or certain of the illustrated blocks or diamonds may not be employed.

In various embodiments, as indicated in block 102, the gaming system maintains a progressive award that is associated with a quantity of guaranteed occurrences of a designated symbol. In these embodiments, the progressive award is a dynamic award which begins at a default or reset quantity of guaranteed occurrences of the designated symbol and changes from certain plays of the game to other plays of the game. As further indicated in block 102, zero, one or more of the designated symbols are associated with an additional award. In these embodiments, this additional award is distinct and independent of any features or functionality otherwise associated with the designated symbol. As such, each guaranteed occurrence of the designated symbol associated with the progressive award qualifies as either a default designated symbol (e.g., a wild symbol) or an additional award designated symbol (e.g., a wild value symbol). Such a default designated symbol is not associated with any additional award while an additional award designated symbol is associated with one or more additional awards.

Figure 2A:
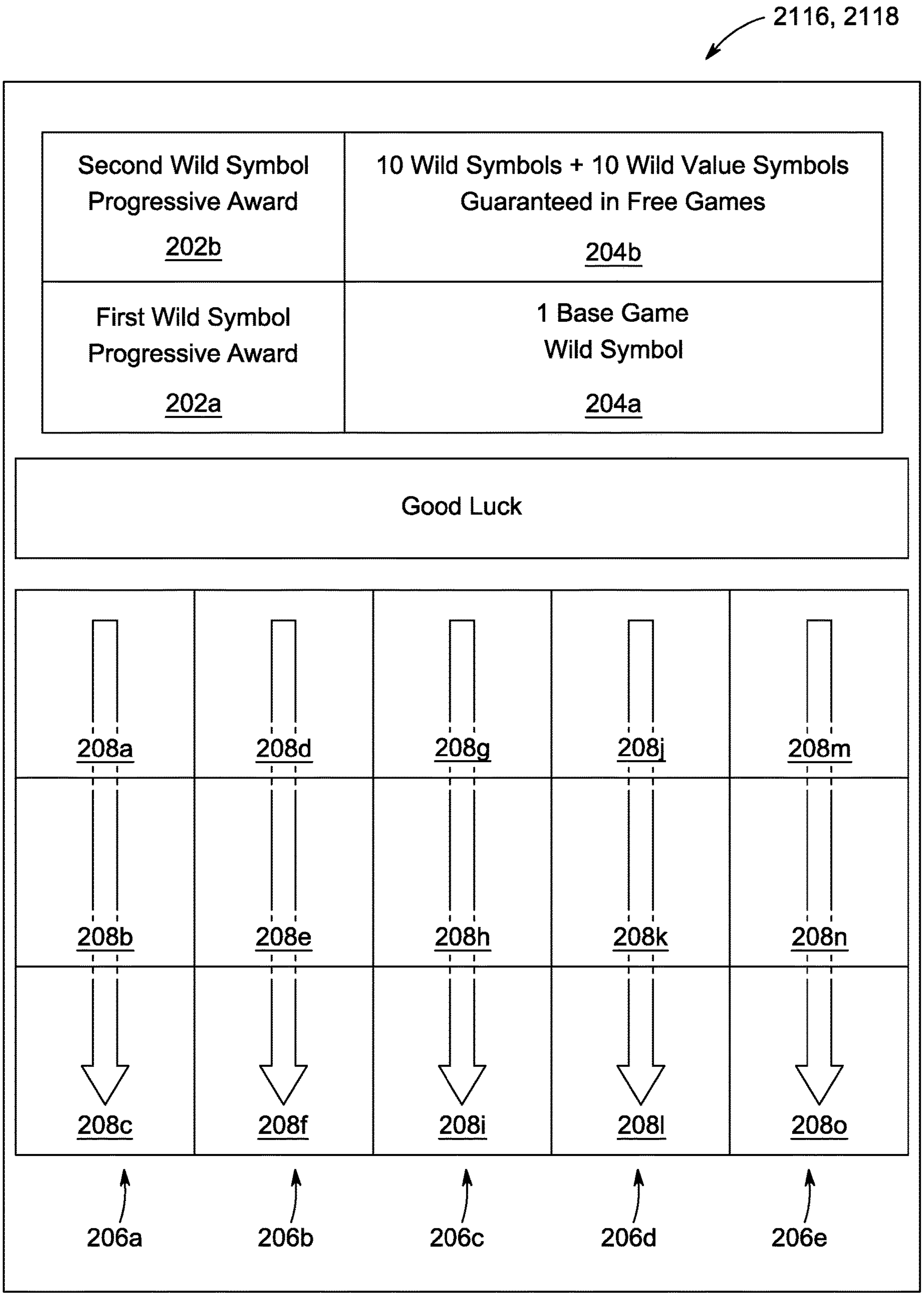
FIGS. 2A, 2B, 2C, 2D, 2E and 2F are front views of one embodiment of the gaming system of the present disclosure illustrating plays of a game which results in an increase of a quantity of guaranteed occurrences of a designated symbol associated with a progressive award as well as the use of the determined quantity of guaranteed occurrences of the designated symbol, certain of which are associated with an additional award.

In certain embodiments, the gaming system maintains a plurality of progressive awards that are each associated with a different quantity of guaranteed occurrences of a designated symbol that each may be associated with an additional award. For example, as seen in FIG. 2A, the gaming system maintains two progressive awards which are each associated with a quantity of wild symbols guaranteed to be generated. In this example, certain of the wild symbols associated with zero, one or more of the progressive awards are wild value symbols that are associated with a static value. As seen in FIG. 2A, at a first point in time, a first wild symbol progressive award **202*a* is associated with a first reset quantity of one wild symbol 204*a*, and a second wild symbol progressive award 202*b* is associated with a second reset quantity of twenty wild symbols 204*b*** made up of ten wild symbols (i.e., a wild symbol not associated with any static values) and ten wild value symbols (i.e., a wild symbol associated with a static value). In certain embodiments, the gaming system maintains a plurality of progressive awards that are each associated with a different quantity of a different designated symbol that may be associated with a static value and is guaranteed to be generated. In certain embodiments, the gaming system maintains a plurality of progressive awards that are each associated with a different quantity of the same designated symbol guaranteed to be generated.

In certain embodiments, one or more progressive awards are associated with causing a generation of an associated quantity of the designated symbol for a play of a primary game. In certain embodiments, one or more progressive awards are associated with causing a generation of an associated quantity of the designated symbol for a play of a secondary game. In certain embodiments, one or more progressive awards are associated with causing a generation of an associated quantity of the designated symbol for a play of a primary game and one or more progressive awards are associated with causing a generation of an associated quantity of the designated symbol for a play of a secondary game. For example, as seen in FIG. 2A, of the two progressive awards maintained by the gaming system which are each associated with a quantity of wild symbols, the first wild symbol progressive award **202*a* is associated with causing a generation of an associated quantity of the wild symbols for a play of a primary game while the second wild symbol progressive award 202*b*** is associated with causing a generation of an associated quantity of the wild symbols for a play of a free spin secondary game.

In addition to maintaining the progressive award, upon an occurrence of a game triggering event, the gaming system initiates a play of a game as indicated in block 104 of FIG. 1. In certain embodiments, the game comprises a primary game, such as a primary wagering game, wherein the game triggering event includes the placement of a wager on the play of the primary game. In another embodiment, the game comprises a secondary game, such as a bonus game, wherein the game triggering event occurs based on a displayed event associated with a play of a primary game. In another embodiment wherein the game comprises a secondary game, such as a bonus game, the game triggering event occurs based on an event independent of any displayed event associated with the play of the primary game.

For the initiated play of the game, the gaming system determines and displays a game outcome including a plurality of symbols as indicated in block 106 of FIG. 1. For example, for an initiated play of a game, the gaming system activates a plurality of reels **206*a* to 206*e* associated with a plurality of symbol display positions 208*a* to 208 to spin (as seen in FIG. 2A) and stop to display a plurality of symbols 210*a* to 210*o* at the plurality of symbol display positions 208*a* to 208*e* associated with the plurality of reels 206*a* to 206*e* (as seen in FIG. 2**B).

In addition to the determination and display of a game outcome including a plurality of symbols, the gaming system determines if a progressive award modification event occurred as indicated in diamond 108 of FIG. 1. In these embodiments, the gaming system determines if any event occurred, either as part of or separate and independent of the initiated play of the game, which results in a modification to the quantity of guaranteed occurrences of the designated symbol associated with the maintained progressive award.

In certain embodiments, the progressive award modification event occurs based on a displayed event associated with a play of a game. In certain such embodiments, the progressive award modification event occurs based on whether or not a designated symbol which is associated with a progressive award is included in the plurality of symbols of the displayed game outcome. In these embodiments, the presence of a designated symbol in the displayed game outcome corresponds to an occurrence of a progressive award modification event while the absence of a designated symbol in the displayed game outcome corresponds to a non-occurrence of a progressive award modification event. In certain other embodiments, the progressive award modification event occurs based on whether or not another symbol (which is not otherwise associated with the progressive award) is included in the plurality of symbols of the displayed game outcome. In these embodiments, the presence of this other symbol in the displayed game outcome corresponds to an occurrence of a progressive award modification event while the absence of this other symbol in the displayed game outcome corresponds to a non-occurrence of a progressive award modification event.

In certain embodiments, the progressive award modification event occurs based on an event independent of any displayed event associated with a play of a game. In certain embodiments, the progressive award modification event occurs based on a quantity of games played. In certain embodiments, the progressive award modification event occurs based on a quantity (or amount of) of wagers placed.

As indicated in block 110 of FIG. 1, upon an occurrence of a progressive award modification event, the gaming system modifies the maintained progressive award, such as by increasing the quantity of guaranteed occurrences of the designated symbol associated with the progressive award. In other words, in association with an occurrence of a progressive award modification event, such as the generation of the designated symbol in the displayed game outcome, the gaming system modifies, such as increases (or alternatively decreases) the quantity of guaranteed occurrences of the designated symbol associated with the progressive award.

In certain embodiments wherein the gaming system maintains a plurality of progressive awards, the occurrence of the progressive award modification event results in a modification, such as an increase, of the quantity of guaranteed occurrences of the designated symbol associated with each of the progressive awards. In these embodiments, a progressive award modification event associated with one progressive award causes a modification to the quantities of designated symbols of the plurality of maintained progressive awards. In certain embodiments wherein the gaming system maintains a plurality of progressive awards, the occurrence of the progressive award modification event results in a modification, such as an increase, of the quantity of guaranteed occurrences of the designated symbol associated with at least one, but not all, of the progressive awards.

Figure 2B:
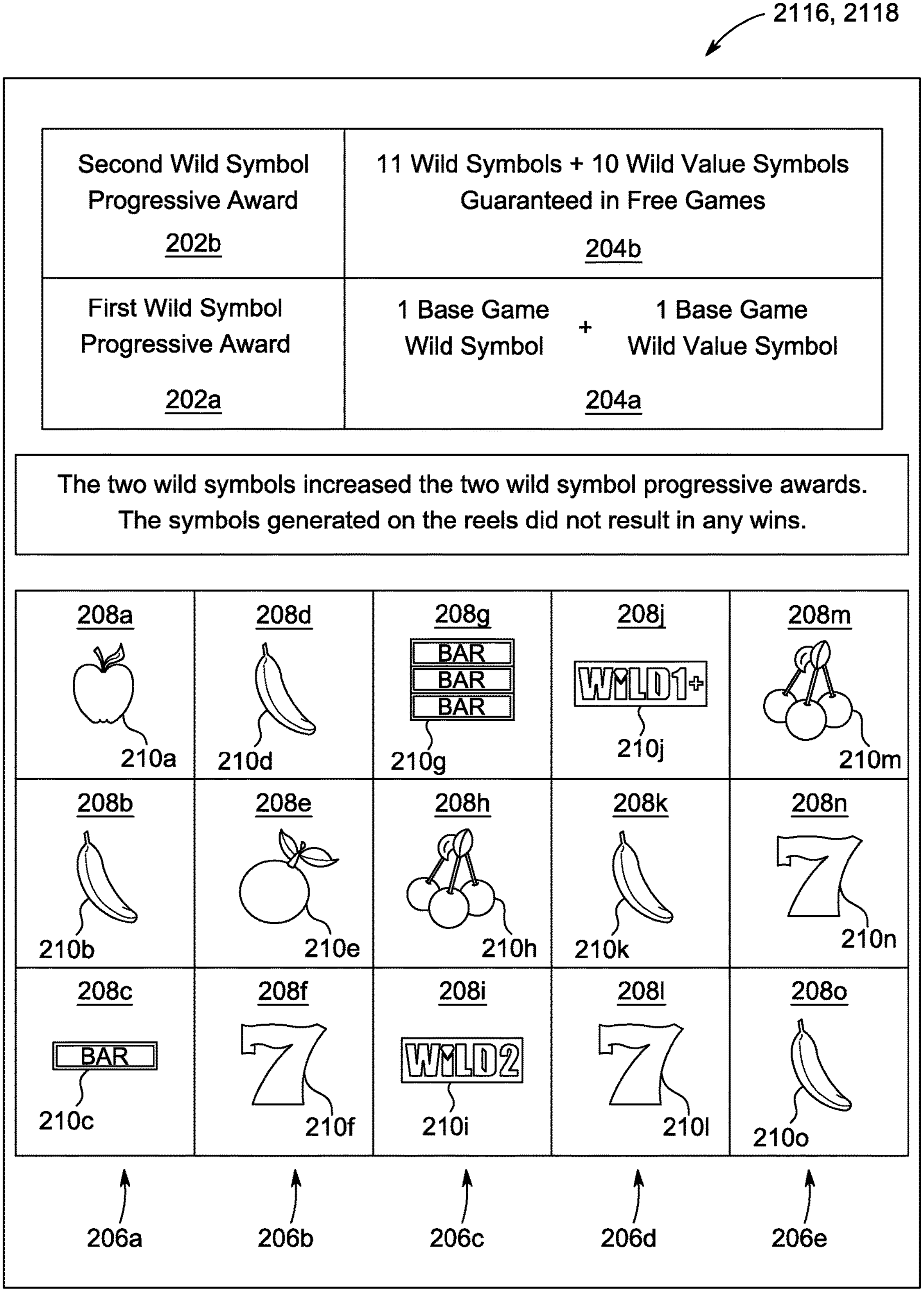

In certain embodiments wherein the gaming system maintains a plurality of progressive awards, the occurrence of the progressive award modification event based on one or more different designated symbols results in a modification, such as an increase, of the quantity of guaranteed occurrences of the designated symbol associated with the corresponding progressive award. For example, as seen in FIG. 2B, following the generation of the plurality of symbols at the plurality of symbol display positions, the gaming system determines that: (i) since wild symbol 210*j* displayed at symbol display position 208*j* is associated with the first wild symbol progressive award, the generation of this wild symbol causes an increase of the quantity of wild symbols associated with the first wild symbol progressive award from one wild symbol to two wild symbols, and (ii) since wild symbol 210*i* displayed at symbol display position 208*i* is associated with the second wild symbol progressive award, the generation of this wild symbol causes an increase of the quantity of wild symbols associated with the second wild symbol progressive award from twenty wild symbols to twenty-one wild symbols. In this example, since wild symbol 210*j* qualifies as a wild value symbol, the gaming system increased the quantity of wild value symbols of the first wild symbol progressive from zero wild value symbols to one wild value symbol. In different embodiments, the value associated with such a wild value symbol is based on an event displayed in association with a play of a game or based on an event independent of any displayed event associated with a play of a game.

As illustrated by this example, upon the gaming system randomly generating a designated symbol (in the form of a wild symbol of this example) for a play of a game, the gaming system accumulates that designated symbol in association with a progressive award formed, at least in part, by a quantity of accumulated designated symbols. In other words, in certain embodiments, a progressive award increment event occurs based on one or more random determinations occurring during one or more plays of a game. Such a configuration provides that one or more randomly determined game play events influence one or more progressive awards which introduces a degree of randomness to how and when such progressive awards are incremented. Specifically, in certain embodiments, the gaming system of the present disclosure differs from prior gaming devices (which increase a progressive award based on a portion of wagers received by that gaming device (such that if an amount of wagers are received by that gaming device, the progressive award will increase by a predictable amount)) via increasing the progressive award based on the random occurrence of one or more game play events. As such and unlike prior gaming devices, if an amount of wagers are received, the progressive award will increase, if at all, by an unpredictable amount that is based on zero, one or more random determinations.

Following the occurrence of the progressive award modification event or upon a determination that no progressive award modification event occurred, the gaming system determines if a progressive award triggering event occurred as indicated in diamond 112 of FIG. 1. In certain embodiments, the progressive award triggering event occurs based on a displayed event associated with the play of the game. In certain other embodiments, the progressive award triggering event occurs based on an event independent of any displayed event associated with the play of the game.

If the gaming system determines that the progressive award triggering event did not occur, as indicated in block 114, the gaming system determines and displays an award amount associated with the plurality of displayed symbols of the displayed game outcome to complete the initiated play of the game and then returns to block 102 to continue to maintain the progressive award. In these embodiments, following any increase of any quantity of guaranteed occurrences of the designated symbol of any progressive award and following the determination not to provide any of that quantity of the designated symbol in association with the initiated play of the game, the gaming system determines any award associated with the determined game outcome and then concludes the initiated play of the game. For example, as seen in FIG. 2B, after increasing the first wild symbol progressive award and the second wild symbol progressive award and determining that no triggering event occurs in association with any of the wild symbol progressive awards, the gaming system determines that the symbols displayed at the symbol display positions do not form any winning symbol combinations associated with any awards and concludes the play of the game.

On the other hand, if the gaming system determines that the progressive award triggering event occurred, as indicated in diamond 116 of FIG. 1, the gaming system determines if the maintained progressive award is associated with a modification of the displayed game outcome of the initiated play of the game. Put differently, the gaming system determines whether the quantity of guaranteed occurrences of the designated symbol associated with the maintained progressive award are to be employed to modify a previously determined game outcome or are to be employed in the generation of one or more subsequently determined game outcomes.

If the gaming system determines that the maintained progressive award is associated with a modification of the displayed game outcome of the initiated play of the game, as indicated in block 118 of FIG. 1, the gaming system modifies the displayed game outcome for the initiated play of the game by employing the quantity of guaranteed occurrences of the designated symbol associated with the maintained progressive award.

In certain embodiments, the gaming system modifies the displayed game outcome for the initiated play of the game by initially replacing a corresponding quantity of the symbols displayed at a corresponding quantity of symbol display positions with the quantity of designated symbols associated with the maintained progressive award. In these embodiments, for each designated symbol associated with an additional award used to replace a symbol from the initiated play of the game, the gaming system displays the additional award associated with that designated value symbol. In certain embodiments, if the quantity of designated symbols associated with the provided progressive award exceeds the quantity of symbols displayed at symbol display positions, the gaming system causes multiple occurrences of the designated symbol to be displayed at a single symbol display position. For example, if a play of the game utilizes fifteen symbol display positions and a provided progressive award is associated with more than fifteen designated symbols, the gaming system operates to first replace the fifteen symbols displayed at the fifteen symbol display positions with fifteen designated symbols and then operates to double up (or triple up or more) designated symbols at one or more of the fifteen symbol display positions until each of the designated symbols associated with the progressive award have been deployed.

In certain embodiments, the gaming system modifies the displayed game outcome for the initiated play of the game by replacing symbols displayed at symbol display positions with the quantity of designated symbols associated with the maintained progressive award independent of any order of replacing symbols at symbol display positions. In these embodiments, the gaming system may display multiple designated symbols at a symbol display position without displaying any designated symbols at one or more of the symbol display positions. That is, independent of the designated quantity of symbols exceeding the quantity of symbols displayed at symbol display positions, the gaming system may cause multiple occurrences of the designated symbol to be displayed at a single symbol display position. For example, if a play of the game utilizes fifteen symbol display positions and a provided progressive award is associated with more than fifteen designated symbols, the gaming system operates to disburse the fifteen designated symbols to one or more of the symbol display positions even if such disbursement results in certain symbol display positions displaying multiple designated symbols while certain other symbol display positions do not display any of the designated symbols.

In certain embodiments, the gaming system utilizes one or more factors in determining which symbols displayed at which symbol display positions to replace with designated symbols associated with the provided progressive award. In one such embodiment, the gaming system factors in different symbol display positions being associated with different probabilities of having the symbol displayed at that symbol display position being replaced with a designated symbol of the quantity of designated symbols associated with the provided progressive award. In another such embodiment, the gaming system additionally or alternatively factors in different symbols being associated with different probabilities of being replaced with a designated symbol of the quantity of designated symbols associated with the provided progressive award. In certain other embodiments, the gaming system additional or alternatively factors in the quantity of designated symbols associated with the provided progressive award. In certain other embodiments, the gaming system additional or alternatively factors in any additional awards associated with any designated symbols. It should be appreciated any suitable order of replacing symbols at symbol display positions with designated symbols (or any suitable lack of order in replacing symbols at symbol display positions with designated symbols) may be utilized in association with the gaming system of the present disclosure.

In certain embodiments, if multiple designated symbols associated with additional awards are displayed at a single symbol display position, the gaming system utilizes the additional awards associated with each of the designated symbols. In these embodiments, as more and more designated symbols associated with additional awards are layered onto a single symbol display position, the gaming system linearly (or non-linearly) combines such additional awards to ensure that the player realizes the benefits of each of the deployed designated symbols associated with the triggered progressive award.

In one such embodiment, if two (or more) designated symbols that are each associated with an additional award are displayed at a single symbol display position, the gaming system adds the additional awards associated with the two (or more) designated symbols and displays the sum of such additional awards in association with the display of a designated symbol at that single symbol display position. Continuing with the above illustrated example, following a plurality of initiated plays of the game (not shown) and a plurality of occurrences of the progressive award modification event (not shown) which have resulted in the quantity of wild symbols associated with the first wild symbol progressive award increasing to twelve wild symbols (including five wild symbols and seven wild value symbols) and the quantity of wild symbols associated with the second wild symbol progressive award increasing to thirty-five wild symbols (including seventeen wild symbols and eighteen wild value symbols), the gaming system determines that since the progressive award triggering event occurred in association with the first wild symbol progressive award and since the first wild symbol progressive award is associated with the modification of the outcome of the initiated play of the game, the gaming system modifies the game outcome for the current play of the game by populating the symbol display positions with the twelve wild symbols associated with the first wild symbol progressive award.

Figure 2C:
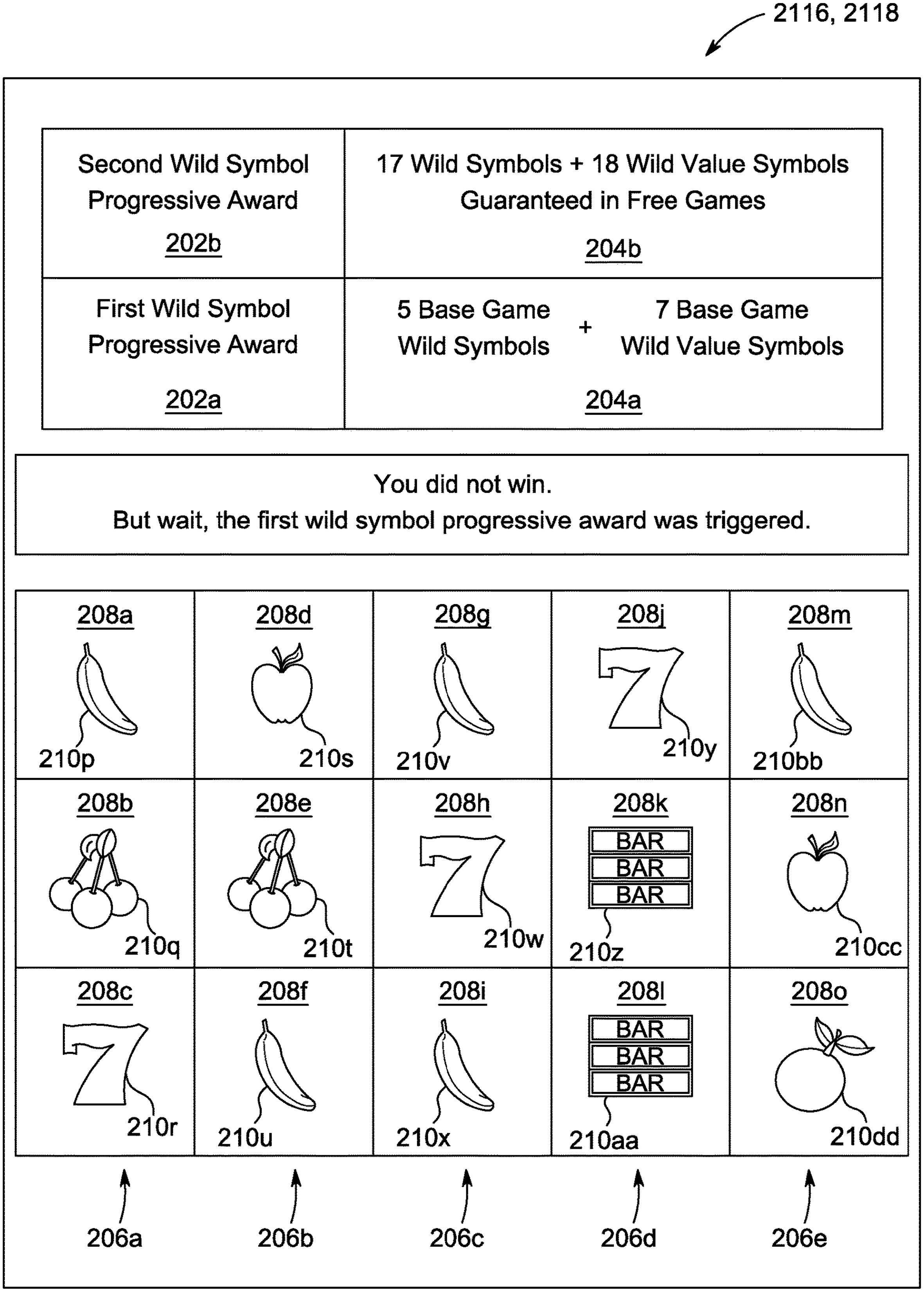
Figure 2D:
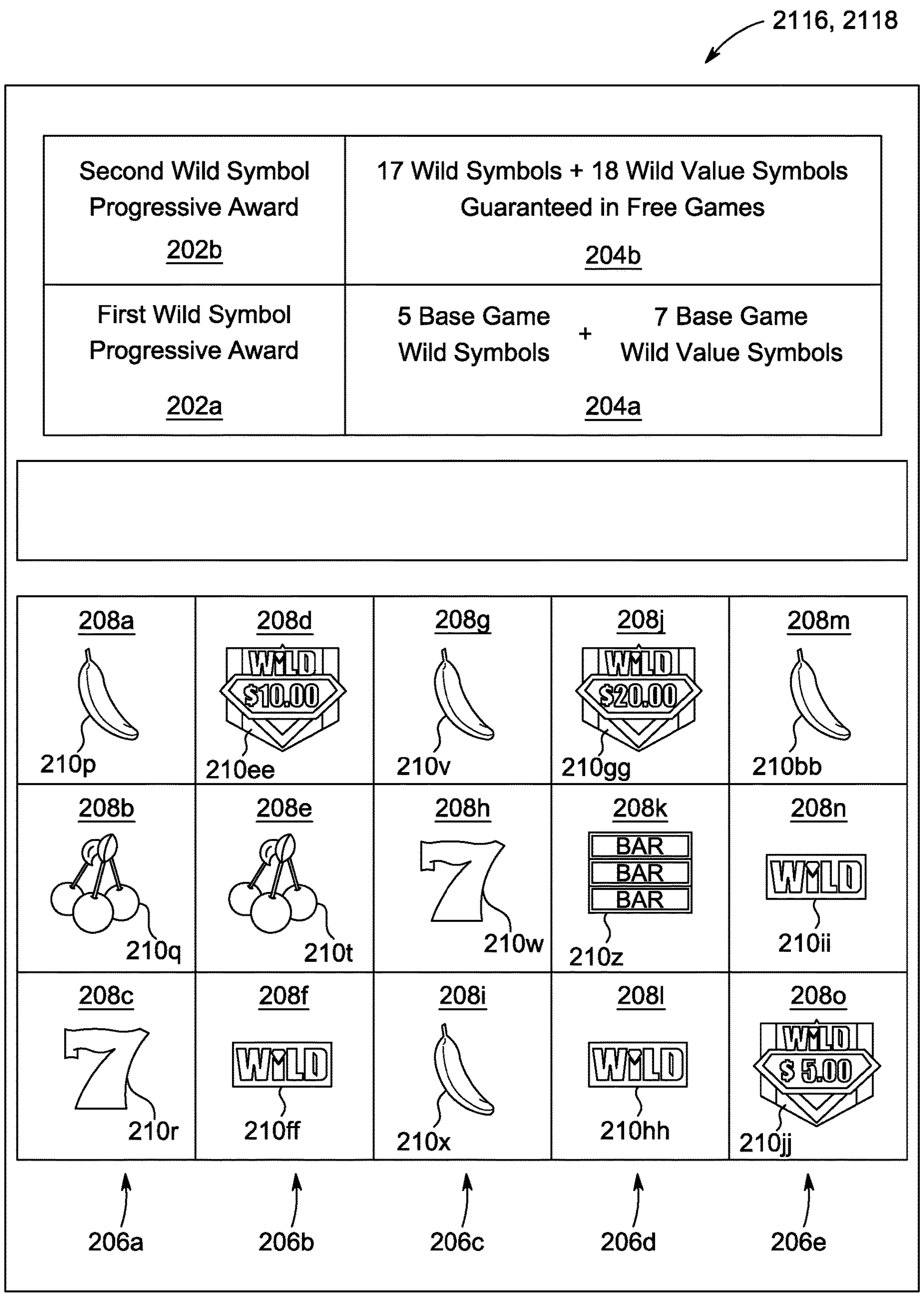
Figure 2E:
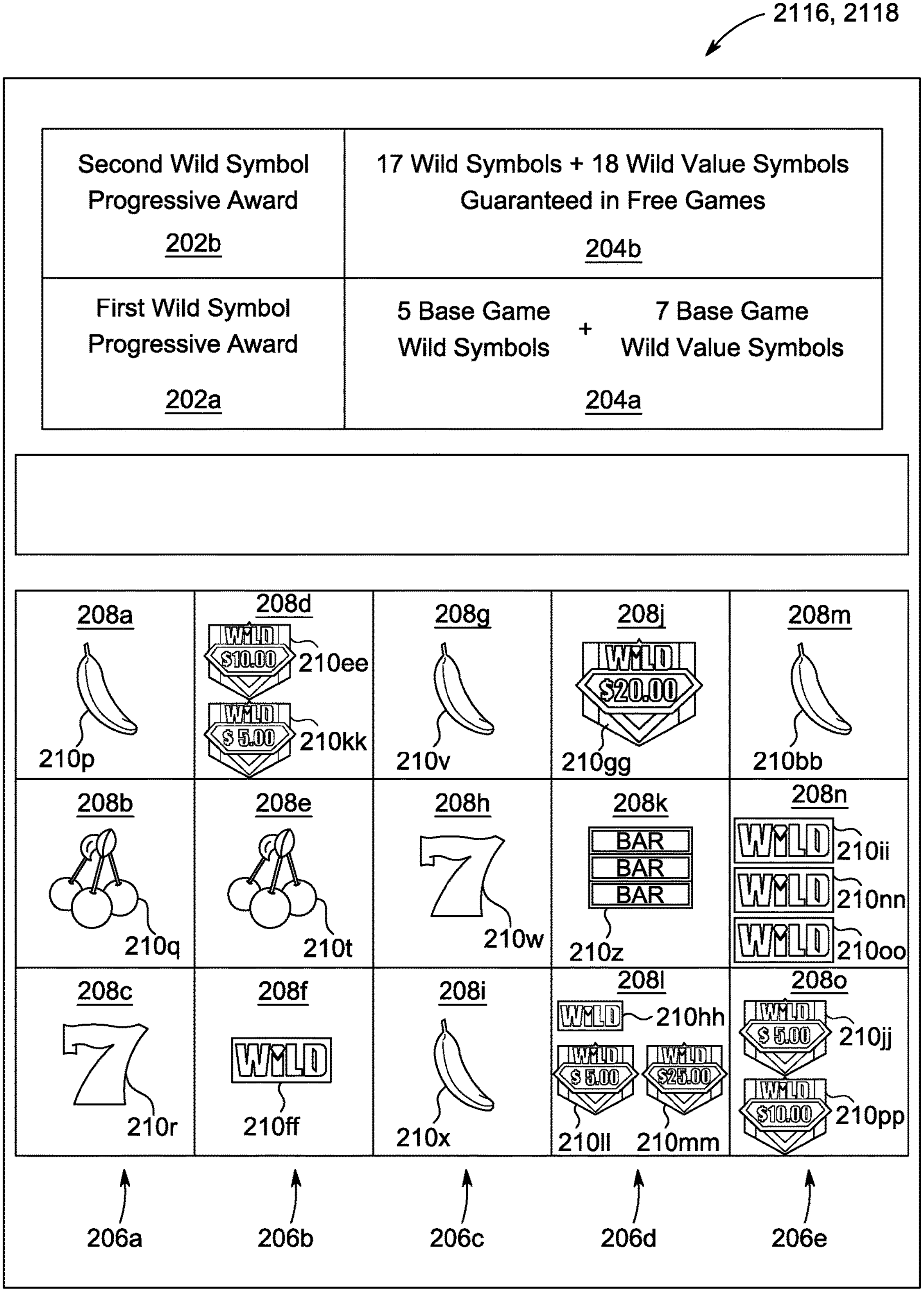

In this example, after the display of a plurality of symbols 210*p* to 210*dd* at the plurality of symbol display positions 208*a* to 208*e* associated with the plurality of reels 206*a* to 206*e* for an initiated play of a game (as seen in FIG. 2C) and the occurrence of a mystery progressive award triggering event for the first wild symbol progressive award (not shown), the gaming system populates certain of the symbol display positions with the twelve wild symbols associated with the first wild symbol progressive award. Specifically and as shown iteratively (for ease of explanation purposes) in FIGS. 2D to 2F, for the utilization of the twelve wild symbols associated with this progressive award, the gaming system first changes, as seen in FIG. 2D, six non-wild symbols displayed at six symbol display positions to six wild symbols (including three wild value symbols 210*ee*, 210*gg*, and 210*jj* that are each associated with a displayed value). In this example, the gaming system then utilizes, as seen in FIG. 2E, the remaining six wild symbols (including four wild value symbols 210*kk*, 210*ll*, 210*mm* and 210*pp* that are each associated with a displayed value) to associate multiple wild symbols with four of the six symbol display positions.

Figure 2F:
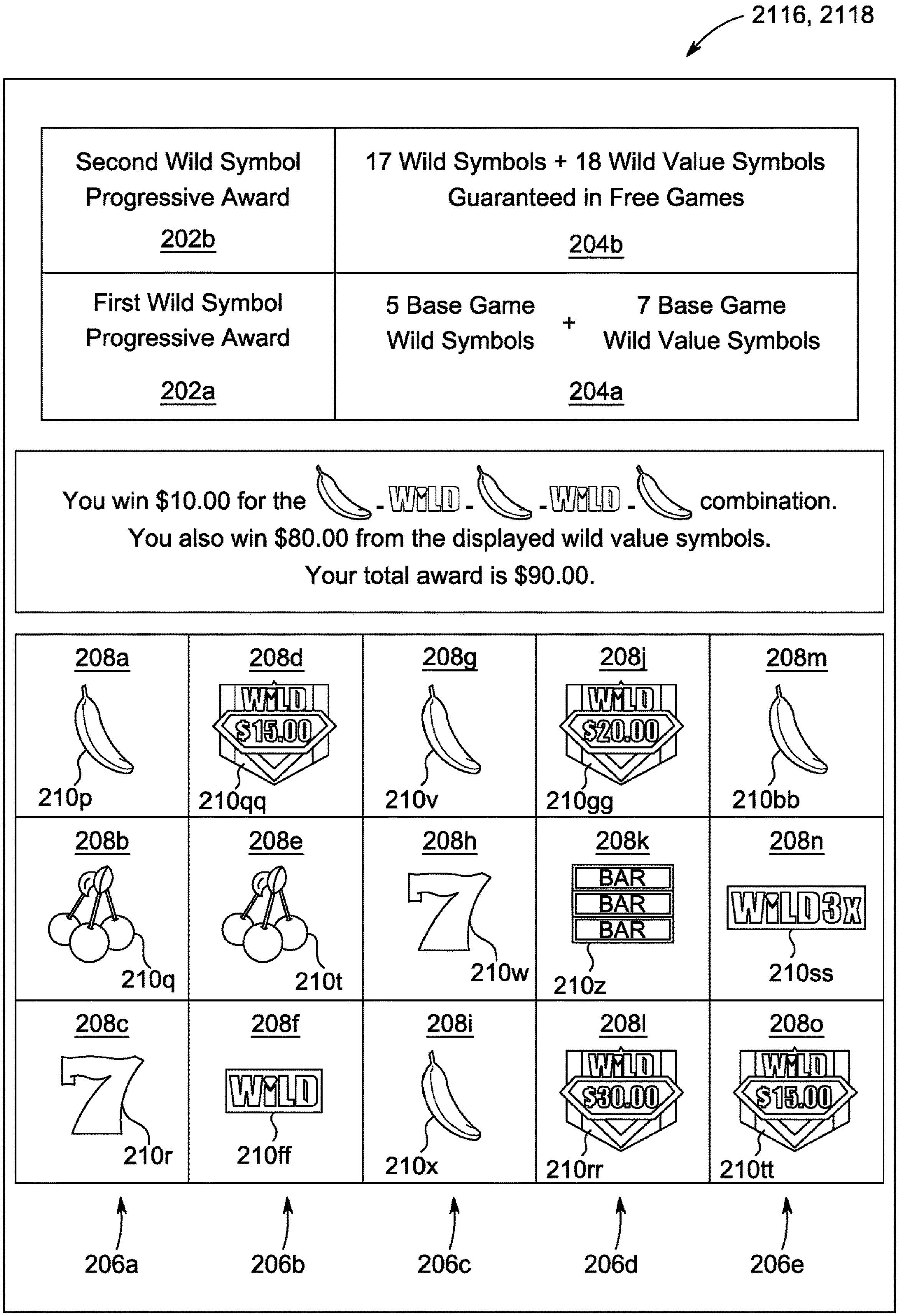

In this example, following the distribution of each of the twelve wild symbols associated with the progressive award, for each of the four symbol display position associated with two or more wild symbols, the gaming system combines, as seen in FIG. 2F, the wild symbols displayed at such symbol display positions to form combined wild symbols 210*qq*, 210*rr*, 210*ss*, and 210*tt*. In this example, for each combination of wild value symbols, the gaming system adds the values associated with each wild value symbol and displays a sum of such values in association with the display of the wild symbol at that single symbol display position (as seen with combined wild symbols 210*qq*, 210*rr* and 210*tt* in FIG. 2F). In this example, for each combination of wild symbols, the gaming system increases a modifier (e.g., a multiplier) for each instance of the wild symbol at that symbol display position and displays the modifier in association with the display of the wild symbol at that single symbol display position (as seen with combined wild symbol 210*rr* employing a 1× multiplier (not shown) and combined wild symbol 210*ss* employing a 3× multiplier in FIG. 2F).

In another such embodiment, if two (or more) designated symbols that are each associated with an additional award are displayed at a single symbol display position, the gaming system multiplies the additional awards associated with the two (or more) designated symbols and displays the product of such additional awards in association with the display of a designated symbol at that single symbol display position. In another such embodiment, if two (or more) designated symbols that are each associated with an additional award are displayed at a single symbol display position, the gaming system adds the additional awards associated with the two (or more) designated symbols, multiplies the sum of such additional awards by the quantity of two (or more) designated symbols displayed at the single symbol display position and then displays the product in association with the display of a designated symbol at that single symbol display position. It should be appreciated that the gaming system may apply any suitable mathematical operation to the additional awards associated with the multiple designated symbols displayed at one or more of the symbol display positions. It should be further appreciated that the gaming system may apply any suitable mathematical operation (or none at all) to the multiple designated symbols that are not associated with any additional awards but are displayed at one or more of the symbol display positions.

In certain embodiments, if multiple designated symbols associated with additional awards are displayed at a single symbol display position, the gaming system utilizes the additional awards associated with at least one of, but not each of, the designated symbols. In these embodiments, as more and more designated symbols associated with additional awards are layered onto a single symbol display position, the gaming system linearly (or non-linearly) combines certain of, but not each of, such additional awards to ensure that the player partially realizes the benefits of certain of the deployed designated symbols associated with the triggered progressive award.

In certain embodiments, if multiple designated symbols associated with additional awards are displayed at a single symbol display position, the gaming system utilizes the additional award associated with the last (or first or any singular) designated symbol displayed at that symbol display position. In these embodiments, as more and more designated symbols associated with additional awards are layered onto a single symbol display position, the gaming system utilizes the additional award of one of such designated symbols (such as the highest value additional award) to provide an additional benefit to the player in association with the triggered progressive award.

Following the modification of the displayed game outcome for the initiated play of the game by employing the quantity of guaranteed occurrences of the designated symbol associated with the maintained progressive award, as indicated in block 120 of FIG. 1, the gaming system proceeds with determining and displaying a total award amount for the initiated play of the game. In these embodiments, as further seen in block 120, the total award amount is formed from any award amount associated with the modified game outcome and one or more additional awards displayed in association with one or more designated symbols. Put differently, if the gaming system determines that the quantity of guaranteed occurrences of the designated symbol accumulated in association with the maintained progressive award will be used for the initiated play of the game, the gaming system causes such a quantity of guaranteed occurrences of the designated symbol to alter the previously determined game outcome to potentially result in a more lucrative award via a formation of a more lucrative symbol combination and/or via the additional awards associated with zero, one or more displayed designated symbols. Continuing with the above example, as seen in FIG. 2F, the replacement of six non-wild symbols to six wild symbols (collectively formed from the twelve distributed wild symbols associated with the progressive award) resulted in changing a losing game outcome for the initiated play of the game to a winning game outcome associated with an award of $10.00. Moreover, in this example, the distribution of the seven wild value symbols that collectively are associated with a value of $80 resulted in a total award of $90.00 for the play of the game.

Following the gaming system utilizing the quantity of guaranteed occurrences of the designated symbol associated with the progressive award to modify the displayed game outcome of the initiated play of the game, the gaming system resets the quantity of guaranteed occurrences of the designated symbol associated with the progressive award to a reset quantity of guaranteed occurrences of the designated symbol. In these embodiments, zero, one or more of the designated symbols of the reset quantity of guaranteed occurrences of the designated symbol are associated with an additional award. For example, after utilizing the twelve wild symbols associated with the first wild symbol progressive award to change a losing game outcome to a winning game outcome and further to provide an award value from the displayed wild value symbols, the gaming system resets the quantity of wild symbols associates with the first wild symbol progressive award to a reset quantity of one wild symbol and concludes the initiated play of the game.

Returning to FIG. 1, if the gaming system determines that the maintained progressive award is not associated with a modification of the displayed game outcome of the initiated play of the game, the gaming system triggers a designated symbol sequence including a quantity of plays of a secondary game and associated with the quantity of guaranteed occurrences of the designated symbol of the progressive award as indicated in block 122 of FIG. 1. Put differently, upon a progressive award triggering event not associated with a modification of a previously generated game outcome for the initiated play of the game, the gaming system concludes the initiated play of the game (via determining and displaying any award associated with the displayed game outcome as explained above with reference to block 114 but not otherwise shown in FIG. 1) and proceeds to a designated symbol sequence to redeem the quantity of guaranteed occurrences of the designated symbol accumulated in association the progressive award.

For the triggered designated symbol sequence, as indicated in block 124, the gaming system displays the quantity of plays of the secondary game wherein over the course of the quantity of plays of the secondary game, at least the quantity of guaranteed occurrences of the designated symbol associated with the progressive award are generated. As further indicated in block 124, over the course of the quantity of plays of the secondary game, a total award amount is formed from any award amount associated with the individual game outcomes (or the individual modified game outcomes) determined for the individual plays of the secondary game and one or more additional awards displayed in association with one or more designated symbols. In other words, upon a determination to utilize a designated symbol sequence to redeem the quantity of guaranteed occurrences of the designated symbol associated with the progressive award, the gaming system provides a quantity of plays of a secondary game which cumulatively will cause the generation of at least the quantity of guaranteed occurrences of the designated symbol (certain of which are associated with an additional awards) associated with the progressive award. It should be appreciated that unlike certain gaming systems which merely add symbols to reels for a play of a game wherein such symbols are not guaranteed to actually be generated, the gaming system of the present disclosure guarantees that the quantity of guaranteed occurrences of the designated symbol associated with the progressive award will actually be generated for the ensuing quantity of plays of the secondary game. In other words, rather than increasing the probability of certain symbols being generated (via increasing the quantity of those symbols on the reels) wherein such symbols may or may not be generated dependent of one or more subsequent determination, the gaming system of the present disclosure guarantees that such symbols will be generated independent of any subsequent determinations.

For each of the quantity of plays of the secondary game of the triggered designated symbol sequence, the gaming system determines and displays a secondary game outcome and any associated award while tracking the quantity of occurrences of the designated symbol to ensure that at least the quantity of guaranteed occurrences of the designated symbol associated with the progressive award are part of the displayed secondary game outcomes. As such, from the first play of the secondary game of the triggered designated symbol sequence to the last play of the secondary game of the triggered designated symbol sequence, the gaming system accounts for the total quantity of designated symbols generated to ensure that over the course of all of such plays of the secondary game, at least the quantity of guaranteed occurrences of the designated symbol associated with the progressive award will be generated.

More specifically, to provide the guaranteed quantity of occurrences of the designated symbol as part of the triggered designated symbol sequence, after each play of the secondary game, the gaming system determines if the most recently completed play of the secondary game was the second to last play of the game of the triggered sequence as well as determines a quantity of guaranteed occurrences of the designated symbol generated during the plays of the secondary game of the triggered sequence. If the gaming system determines that at least two games remains to be played in the triggered sequence, the gaming system proceeds to the next play of the secondary game of the triggered sequence. If the gaming system determines that one game remains to be played in the triggered sequence and at least one designated symbol of the quantity of guaranteed occurrences of the designated symbol remains unused, the gaming system proceeds to the last play of the secondary game of the triggered sequence wherein the remaining quantity of unused designated symbols are generated for the last play of the secondary game. If the gaming system determines that one game remains to be played in the triggered sequence and each of the designated symbols of the quantity of guaranteed occurrences of the designated symbol have been used during the plays of the secondary games of the triggered sequence, the gaming system proceeds to the last play of the secondary game of the triggered sequence.

It should be appreciated that while the gaming system utilizes one or more events to determine a quantity of the designated symbol that will actually be generated for the ensuing plays of the secondary game, the gaming system may generate additional designated symbols for that plays of the secondary game. That is, the quantity of the designated symbol guaranteed to be generated represents a minimum quantity of the designated symbol which will be generated for the ensuing plays of the secondary game of the triggered sequence.

It should be further appreciated that as described above with responsive to the display of any designated symbols associated with additional awards used to modify the game outcome of a current play of a game, the gaming system similarly causes any additional awards associated with any designated symbols to be provided over the plays of the secondary game. In these embodiments, for any individual play of the secondary game in which a single designated symbol associated with an additional award (that is associated with the progressive award) is caused to be displayed at a symbol display position, the gaming system provides that additional award in association with the individual play of the secondary game. Additionally, in these embodiments, for any individual play of the secondary game in which multiple designated symbols associated with additional awards are displayed at a single symbol display position, the gaming system provides such additional awards in association with the individual play of the secondary game. In these embodiments, as more and more designated symbols associated with additional awards are layered onto a single symbol display position for an individual play of the secondary game, the gaming system linearly (or non-linearly) combines such additional awards to ensure that the player realizes the benefits of the deployed designated symbols associated with the triggered progressive award.

In certain embodiments, over the course of the plays of the secondary game, as designated symbols associated with a progressive award are displayed at symbol display positions, the gaming system accumulates such designated symbols in association with the symbol display position. An accumulated designated symbol persists at that symbol display position for one or more subsequent plays of the secondary game. In these embodiments, for any series of plays of the secondary game in which a single designated symbol associated with an additional award (that is associated with the progressive award) is caused to be displayed and accumulated at a symbol display position, the gaming system provides (either one time or multiple times for the series of plays) that additional award. Additionally, in these embodiments, for any series of plays of the secondary game in which multiple designated symbols associated with additional awards are displayed and accumulated at a single symbol display position, the gaming system provides (either one time or multiple times for the series of plays) such additional awards. In these embodiments, as more and more designated symbols associated with additional awards are layered onto a single symbol display position over one or more plays of the secondary game, the gaming system linearly (or non-linearly) combines such additional awards to ensure that the player realizes the benefits of the deployed designated symbols associated with the triggered progressive award.

In certain embodiments, the gaming system guarantees that the quantity of guaranteed occurrences of the designated symbol associated with the progressive award will be generated over the course of the quantity of plays of the secondary game by utilizing zero, one or more overlay designated symbols at zero, one or more of the symbol display positions associated with the reels. In certain embodiments, the gaming system guarantees that the quantity of guaranteed occurrences of the designated symbol associated with the progressive award will be generated over the course of the quantity of plays of the secondary game by utilizing replacement reels which are configured to ensure that the determined quantity of guaranteed occurrences of the designated symbol will be displayed. It should be appreciated that to ensure that the quantity of guaranteed occurrences of the designated symbol of the progressive award are each used during the plays of the secondary game of the triggered sequence, the gaming system may generate multiple occurrence of the designated symbol at one symbol display position and/or periodically modify the frequency of generating the designated symbol based on the quantity of plays of the secondary game completed and the quantity of guaranteed occurrences of the designated symbol that remain to be generated for the triggered sequence.

Following the gaming system utilizing the quantity of guaranteed occurrences of the designated symbol associated with the progressive award as part of a triggered designated symbol sequence, the gaming system resets the quantity of guaranteed occurrences of the designated symbol associated with the progressive award to a reset quantity of guaranteed occurrences of the designated symbol as described above.

It should be appreciated that while illustrated as the gaming system employing a quantity of designated symbols, such as wild symbols, that may or may not be associated with an additional award when accumulated, in different embodiments, the gaming system determines whether or not to associate an additional award with each designated symbol responsive to different events occurring. In one such embodiment, the gaming system associates zero, one or more additional awards with a designated symbol prior to that designated symbol being accumulated. In another such embodiment, the gaming system additionally or alternatively associates zero, one or more additional awards with a designated symbol in association with when that designated symbol is accumulated. In another such embodiment, the gaming system additionally or alternatively associates zero, one or more additional awards with a designated symbol in association with when that designated symbol is redeemed or otherwise distributed in association with one or more plays of a game.

It should be additionally appreciated that while illustrated as the gaming system employing a quantity of wild symbols (that may or may not be associated with an additional award) guaranteed to occur for an individual play of a game and/or over a series of plays of a secondary game, any suitable type of symbol (that may or may not be associated with an additional award) employing any suitable symbol feature may be employed as the designated symbol. In different embodiments, for each individual play of the game and/or over a series of plays of a secondary game, the gaming system utilizes one or more of: a quantity of guaranteed occurrences of a modifier symbol (that may or may not be associated with an additional award), such as, but not limited to, a multiplier symbol or a wild multiplier symbols; a quantity of guaranteed occurrences of an expanding symbol (that may or may not be associated with an additional award) such as, but not limited to, an expanding wild symbol and/or an expanding modifier symbol; a quantity of guaranteed occurrences of a stacked symbol (that may or may not be associated with an additional award) such as, but not limited to, a stacked wild symbol and/or a stacked modifier symbol; a quantity of guaranteed occurrences of a moving symbol (that may or may not be associated with an additional award), such as, but not limited to, a moving wild symbol and/or a moving modifier symbol; a quantity of guaranteed occurrences of a nudging symbol (that may or may not be associated with an additional award), such as, but not limited to, a nudging wild symbol and/or a nudging modifier symbol, a quantity of guaranteed occurrences of a book-end symbol (that may or may not be associated with an additional award), such as, but not limited to, a book-end wild symbol and/or a book-end modifier symbol; a quantity of guaranteed occurrences of a retrigger symbol (that may or may not be associated with an additional award); a quantity of guaranteed occurrences of an anti-terminator symbol (that may or may not be associated with an additional award); a quantity of guaranteed occurrences of a locking symbol (that may or may not be associated with an additional award), such as, but not limited to, a locking wild symbol and/or a locking modifier symbol, and/or a quantity of guaranteed occurrences of a locking reel symbol (that may or may not be associated with an additional award), such as, but not limited to, a locking wild reel symbol and/or a locking modifier reel symbol.

It should be further appreciated that while certain illustrated embodiments employ a reel game to generate the quantity of guaranteed occurrences of the designated symbol (that may or may not be associated with an additional award) associated with the progressive award, any suitable game may be employed to generate the quantity of guaranteed occurrences of the designated symbol (that may or may not be associated with an additional award) associated with the progressive award. In different embodiments, such plays of such games include, but are not limited to: one or more plays of any suitable video or mechanical slot or reel game; one or more plays of any suitable card game, such as but not limited to any suitable poker game, any suitable blackjack game, or any suitable Baccarat game; one or more plays of any suitable keno game; one or more plays of any suitable bingo game; one or more plays of any suitable table game (whether or not such table game is occurring at a gaming table); one or more plays of any suitable wheel game; one or more plays of any suitable offer and acceptance game; one or more plays of any suitable award ladder game; one or more plays of any suitable puzzle-type game; one or more plays of any suitable persistence game; one or more plays of any suitable selection game; one or more plays of any suitable cascading symbols game; one or more plays of any suitable ways to win game; one or more plays of any suitable scatter pay game; one or more plays of any suitable coin-pusher game; one or more plays of any suitable elimination game; one or more plays of any suitable stacked wilds game; one or more plays of any suitable trail game; one or more plays of any suitable bingo game; one or more plays of any suitable video scratch-off game; one or more plays of any suitable pick-until-complete game; one or more plays of any suitable shooting simulation game; one or more plays of any suitable racing game; one or more plays of any suitable promotional game; one or more plays of any suitable high-low game; one or more plays of any suitable lottery game; one or more plays of any suitable number selection game; one or more plays of any suitable dice game; one or more plays of any suitable auction game; one or more plays of any suitable reverse-auction game; and/or one or more plays of any suitable group game.

In certain embodiments, rather than employing a quantity of designated symbols (that may or may not be associated with an additional award) guaranteed to occur for an individual play of a game and/or over a series of plays of a secondary game, the gaming system employs one or more features (that may or may not be associated with an additional award) associated with a progressive award that are guaranteed to be activated for an individual play of a game and/or over a series of plays of a secondary game. Moreover, rather than employing, as shown in FIGS. 2A to 2F, award values as the additional awards associated with certain of the designated symbols, the gaming system employs one or more features as the additional awards associated with zero, one or more of the designated symbols of a progressive award that are guaranteed to be activated for an individual play of a game and/or over a series of plays of a secondary game. In different embodiments, such features (that may or may not be associated with an additional award) associated with a progressive award that are guaranteed to be activated for an individual play of a game and/or over a series of plays of a secondary game and/or such features that operate as the additional award associated with zero, one or more designated symbols include, but are not limited to: a feature which modifies one or more game outcomes of one or more plays of a game (e.g., the symbols evaluated for the play(s) of the game); a feature which modifies the paytable utilized for an individual play of a game and/or over a series of plays of a secondary game; a feature which modifies any award determined for an individual play of a game and/or over a series of plays of a secondary game; a feature which superimposed one or more symbols over the randomly generated symbols of the reels; a feature which replaces one or more symbols of the randomly generated symbols of the reels with a predetermined symbol pattern; a feature which replaces one or more symbols of the randomly generated symbols of the reels with a predetermined pattern of wild symbols; a feature which provides an additional award amount to a player; a feature modifying an amount of credits of a credit balance; a feature modifying an amount of promotional credits; a feature modifying a rate of earning player tracking points; a feature modifying a triggering event of a play of a secondary or bonus game; a feature modifying an activation of a secondary or bonus display (such as an award generator); a feature modifying a quantity of activations of a secondary or bonus display (e.g., a feature modifying a quantity of spins of an award generator); a feature modifying a quantity of sections of a secondary or bonus display (e.g., a feature modifying a quantity of sections of an award generator); a feature modifying one or more awards of a secondary or bonus display; a feature modifying an activation of a community award generator; a feature modifying a quantity of activations of a community award generator; a feature modifying a quantity of sections of a community award generator; a feature modifying one or more awards of a community award generator; a feature modifying a generated outcome (or a designated generated outcome) in a secondary game; a feature modifying a placed wager amount; a feature modifying a placed side wager amount; a feature modifying a number of wagered on paylines; a feature modifying a wager placed on one or more paylines (or on one or more designated paylines); a feature modifying a number of ways to win wagered on; a feature modifying a wager placed on one or more ways to win (or on one or more designated ways to win); a feature modifying an average expected payback percentage for an individual play of a game and/or over a series of plays of a secondary game; a feature modifying an average expected payout for an individual play of a game and/or over a series of plays of a secondary game; a feature modifying one or more awards available; a feature modifying a range of awards available; a feature modifying a type of awards available; a feature modifying one or more progressive awards; a feature modifying which progressive awards are available to be won; a feature modifying an activation of a reel (or a designated reel); a feature modifying an activation of a plurality of reels; a feature modifying a generated outcome (or a designated generated outcome) on a designated payline; a feature modifying a generated outcome (or a designated generated outcome) in a scatter configuration; a feature modifying a winning way to win (or a designated winning way to win); a feature modifying a designated symbol or symbol combination; a feature modifying a generation of a designated symbol or symbol combination on a designated payline; a feature modifying a generation of a designated symbol or symbol combination in a scatter configuration; a feature modifying a quantity of picks in a selection game; a feature modifying a quantity of offers in an offer and acceptance game; a feature modifying a quantity of moves in a trail game; a feature modifying an amount of free spins provided; a feature modifying a game terminating or ending condition; a feature modifying how one or more aspects for an individual play of a game and/or over a series of plays of a secondary game (e.g., colors, speeds, sound) are displayed to a player; and/or a feature modifying any game play feature associated with any play of any game of the present disclosure.

In different embodiments, the awards provided in association with an individual play of a game and/or over a series of plays of a secondary game include, but are not limited to, one or more of: a quantity of monetary credits, a quantity of non-monetary credits, a quantity of promotional credits, a quantity of player tracking points, a progressive award, a modifier, such as a multiplier, a quantity of free plays of one or more games, a quantity of plays of one or more secondary or bonus games, a multiplier of a quantity of free plays of a game, one or more lottery based awards, such as lottery or drawing tickets, a wager match for one or more plays of one or more games, an increase in the average expected payback percentage for one or more plays of one or more games, one or more comps, such as a free dinner, a free night's stay at a hotel, a high value product such as a free car, or a low value product, one or more bonus credits usable for online play, a lump sum of player tracking points or credits, a multiplier for player tracking points or credits, an increase in a membership or player tracking level, one or more coupons or promotions usable within and/or outside of the gaming establishment (e.g., a 20% off coupon for use at a convenience store), virtual goods associated with the gaming system, virtual goods not associated with the gaming system, an access code usable to unlock content on an internet.

In one embodiment, the gaming system causes at least one display device of the gaming system to display, in association with the employment of a progressive award associated with a quantity of guaranteed occurrences of a designated symbol, an individual play of a game and/or a series of plays of a secondary game. In another embodiment, the gaming system additionally or alternatively causes one or more community or overhead display devices to display, in association with the employment of a progressive award associated with a quantity of guaranteed occurrences of a designated symbol, part or all of an individual play of a game and/or a series of plays of a secondary game to one or more other players or bystanders either at a gaming establishment or viewing over a network, such as the internet. In another embodiment, the gaming system additionally or alternatively causes one or more internet sites to each display, in association with the employment of a progressive award associated with a quantity of guaranteed occurrences of a designated symbol, an individual play of a game and/or a series of plays of a secondary game such that a player is enabled to log on from a personal web browser.

In different embodiments, a game triggering event, a progressive award modification event, and/or a progressive award triggering event occurs based on an outcome associated with one or more plays of any primary games. In one embodiment, such determinations are symbol driven based on the generation of one or more designated symbols or symbol combinations. In various embodiments, a generation of a designated symbol (or sub-symbol) or a designated set of symbols (or sub-symbols) over one or more plays of a primary game causes such conditions to be satisfied and/or one or more of such events to occur.

In different embodiments, the gaming system does not provide any apparent reasons to the players for an occurrence of a game triggering event, a progressive award modification event, and/or a progressive award triggering event. In these embodiments, such determinations are not triggered by an event in a primary game or based specifically on any of the plays of any primary games. That is, these events occur without any explanation or alternatively with simple explanations.

In one such embodiment, a game triggering event, a progressive award modification event, and/or a progressive award triggering event occurs based on an amount of coin-in. In this embodiment, the gaming system determines if an amount of coin-in reaches or exceeds a designated amount of coin-in (i.e., a threshold coin-in amount). Upon the amount of coin-in wagered reaching or exceeding the threshold coin-in amount, the gaming system causes one or more of such events or conditions to occur. In another such embodiment, a game triggering event, a progressive award modification event, and/or a progressive award triggering event occurs based on an amount of virtual currency-in. In this embodiment, the gaming system determines if an amount of virtual currency-in wagered reaches or exceeds a designated amount of virtual currency-in (i.e., a threshold virtual currency-in amount). Upon the amount of virtual currency-in wagered reaching or exceeding the threshold virtual currency-in amount, the gaming system causes one or more of such events or conditions to occur. In different embodiments, the threshold coin-in amount and/or the threshold virtual currency-in amount is predetermined, randomly determined, determined based on a player's status (such as determined through a player tracking system), determined based on a generated symbol or symbol combination, determined based on a random determination by the central controller, determined based on a random determination at the gaming system, determined based on one or more side wagers placed, determined based on the player's primary game wager, determined based on time (such as the time of day) or determined based on any other suitable method or criteria.

In one such embodiment, a game triggering event, a progressive award modification event, and/or a progressive award triggering event occurs based on an amount of coin-out. In this embodiment, the gaming system determines if an amount of coin-out reaches or exceeds a designated amount of coin-out (i.e., a threshold coin-out amount). Upon the amount of coin-out reaching or exceeding the threshold coin-out amount, the gaming system causes one or more of such events or conditions to occur. In another such embodiment, a game triggering event, a progressive award modification event, and/or a progressive award triggering event occurs based on an amount of virtual currency-out. In this embodiment, the gaming system determines if an amount of virtual currency-out reaches or exceeds a designated amount of virtual currency-out (i.e., a threshold virtual currency-out amount). Upon the amount of virtual currency-out reaching or exceeding the threshold virtual currency-out amount, the gaming system causes one or more of such events or conditions to occur. In different embodiments, the threshold coin-out amount and/or the threshold virtual currency-out amount is predetermined, randomly determined, determined based on a player's status (such as determined through a player tracking system), determined based on a generated symbol or symbol combination, determined based on a random determination by the central controller, determined based on a random determination at the gaming system, determined based on one or more side wagers placed, determined based on the player's primary game wager, determined based on time (such as the time of day) or determined based on any other suitable method or criteria.

In different embodiments, a game triggering event, a progressive award modification event, and/or a progressive award triggering event occurs based on a predefined variable reaching a defined parameter threshold. For example, when the $500{,}000^{th}$ player has played EGM (ascertained from a player tracking system), one or more of such events or conditions occur. In different embodiments, the predefined parameter thresholds include a length of time, a length of time after a certain dollar amount is hit, a wager level threshold for a specific device (which EGM is the first to contribute $250,000), a number of EGMs active, or any other parameter that defines a suitable threshold.

In different embodiments, a game triggering event, a progressive award modification event, and/or a progressive award triggering event occurs based on a quantity of games played. In this embodiment, a quantity of games played is set for when one or more of such events or conditions will occur. In one embodiment, such a set quantity of games played is based on historic data.

In different embodiments, a game triggering event, a progressive award modification event, and/or a progressive award triggering event occurs based on time. In this embodiment, a time is set for when one or more of such events or conditions will occur. In one embodiment, such a set time is based on historic data.

In different embodiments, a game triggering event, a progressive award modification event, and/or a progressive award triggering event occurs based upon gaming system operator defined player eligibility parameters stored on a player tracking system (such as via a player tracking card or other suitable manner). In this embodiment, the parameters for eligibility are defined by the gaming system operator based on any suitable criterion. In one embodiment, the gaming system recognizes the player's identification (via the player tracking system) when the player inserts or otherwise associates their player tracking card in the EGM and/or logs into the player tracking system using a mobile device, such as a personal gaming device. The gaming system determines the player tracking level of the player and if the current player tracking level defined by the gaming system operator is eligible for one or more of such events or conditions. In one embodiment, the gaming system operator defines minimum bet levels required for such events or conditions to occur based on the player's card level.

In different embodiments, a game triggering event, a progressive award modification event, and/or a progressive award triggering event occurs based on a system determination, including one or more random selections by the central controller. For example, as described above, the gaming system tracks all active EGMs and the wagers they placed, wherein based on the EGM's state as well as one or more wager pools associated with the EGM, the gaming system determines whether to one or more of such events or conditions will occur. In one such embodiment, the player who consistently places a higher wager is more likely to be associated with an occurrence of one or more of such events or conditions than a player who consistently places a minimum wager. It should be appreciated that the criteria for determining whether a player is in active status or inactive status for determining if one or more of such events occur may the same as, substantially the same as, or different than the criteria for determining whether a player is in active status or inactive status for another one of such events to occur.

In different embodiments, a game triggering event, a progressive award modification event, and/or a progressive award triggering event occurs based on a determination of if any numbers allotted to an EGM match a randomly selected number. In this embodiment, upon or prior to each play of each EGM, an EGM selects a random number from a range of numbers and during each primary game, the EGM allocates the first N numbers in the range, where N is the number of credits bet by the player in that primary game. At the end of the primary game, the randomly selected number is compared with the numbers allocated to the player and if a match occurs, one or more of such events or conditions occur.

It should be appreciated that any suitable manner of causing a game triggering event, a progressive award modification event, and/or a progressive award triggering event to occur may be implemented in accordance with the gaming system and method of the present disclosure. It should be further appreciated that one or more of the above-described triggers occurring may be combined in one or more different embodiments.

It should be appreciated that in different embodiments, one or more of: when a game triggering event, a progressive award modification event, and/or a progressive award triggering event occurs; a quantity of progressive awards to maintain; which designated symbol to associate with each progressive award; which additional awards to associate with which designated symbols of the progressive award; which designated symbols of the progressive award to associated with one or more additional awards; whether to provide the quantity of guaranteed occurrences of a designated symbol (that may or may not be associated with an additional award) in association with a modification of a displayed game outcome or in association with a designated symbol sequence; a reset quantity of guaranteed occurrences of the designated symbol (that may or may not be associated with an additional award) associated with one or more progressive award; a quantity of games of a triggered designated symbol sequence; which type of game to employ for the triggered designated symbol sequence; and/or any determination disclosed herein is/are predetermined, randomly determined, randomly determined based on one or more weighted percentages, determined based on a generated symbol or symbol combination, determined independent of a generated symbol or symbol combination, determined based on a random determination by the central controller, determined independent of a random determination by the central controller, determined based on a random determination at the gaming system, determined independent of a random determination at the gaming system, determined based on at least one play of at least one game, determined independent of at least one play of at least one game, determined based on a player's selection, determined independent of a player's selection, determined based on one or more side wagers placed, determined independent of one or more side wagers placed, determined based on the player's primary game wager, determined independent of the player's primary game wager, determined based on time (such as the time of day), determined independent of time (such as the time of day), determined based on an amount of coin-in accumulated in one or more pools, determined independent of an amount of coin-in accumulated in one or more pools, determined based on a status of the player (i.e., a player tracking status), determined independent of a status of the player (i.e., a player tracking status), determined based on one or more other determinations disclosed herein, determined independent of any other determination disclosed herein or determined based on any other suitable method or criteria.

The above-described embodiments of the present disclosure may be implemented in accordance with or in conjunction with one or more of a variety of different types of gaming systems, such as, but not limited to, those described below.

The present disclosure contemplates a variety of different gaming systems each having one or more of a plurality of different features, attributes, or characteristics. A "gaming system" as used herein refers to various configurations of: (a) one or more servers; (b) one or more electronic gaming machines such as those located on a casino floor; and/or (c) one or more personal gaming devices. Thus, in various embodiments, the gaming system of the present disclosure includes: (a) one or more electronic gaming machines in combination with one or more servers; (b) one or more personal gaming devices in combination with one or more servers; (c) one or more personal gaming devices in combination with one or more electronic gaming machines; (d) one or more personal gaming devices, one or more electronic gaming machines, and one or more servers in combination with one another; (e) a single electronic gaming machine; (f) a plurality of electronic gaming machines in combination with one another; (g) a single personal gaming device; (h) a plurality of personal gaming devices in combination with one another; (i) a single server; and/or (j) a plurality of servers in combination with one another. For brevity and clarity and unless specifically stated otherwise, "EGM" as used herein represents one EGM or a plurality of EGMs, "personal gaming device" as used herein represents one personal gaming device or a plurality of personal gaming devices, and "server" as used herein represents one server or a plurality of servers.

As noted above, in various embodiments, the gaming system includes an EGM (or personal gaming device) in combination with a server. In such embodiments, the EGM (or personal gaming device) is configured to communicate with the server through a data network or remote communication link. In certain such embodiments, the EGM (or personal gaming device) is configured to communicate with another EGM (or personal gaming device) through the same data network or remote communication link or through a different data network or remote communication link. For example, the gaming system includes a plurality of EGMs that are each configured to communicate with a server through a data network.

In certain embodiments in which the gaming system includes an EGM (or personal gaming device) in combination with a server, the server is any suitable computing device (such as a server) that includes at least one processor and at least one memory device or data storage device. As further described herein, the EGM (or personal gaming device) includes at least one EGM (or personal gaming device) processor configured to transmit and receive data or signals representing events, messages, commands, or any other suitable information between the EGM (or personal gaming device) and the server. The at least one processor of that EGM (or personal gaming device) is configured to execute the events, messages, or commands represented by such data or signals in conjunction with the operation of the EGM (or personal gaming device). Moreover, the at least one processor of the server is configured to transmit and receive data or signals representing events, messages, commands, or any other suitable information between the server and the EGM (or personal gaming device). The at least one processor of the server is configured to execute the events, messages, or commands represented by such data or signals in conjunction with the operation of the server. One, more than one, or each of the functions of the server may be performed by the at least one processor of the EGM (or personal gaming device). Further, one, more than one, or each of the functions of the at least one processor of the EGM (or personal gaming device) may be performed by the at least one processor of the server.

In certain such embodiments, computerized instructions for controlling any games (such as any primary or base games and/or any secondary or bonus games) displayed by the EGM (or personal gaming device) are executed by the server. In such "thin client" embodiments, the server remotely controls any games (or other suitable interfaces) displayed by the EGM (or personal gaming device), and the EGM (or personal gaming device) is utilized to display such games (or suitable interfaces) and to receive one or more inputs or commands. In other such embodiments, computerized instructions for controlling any games displayed by the EGM (or personal gaming device) are communicated from the server to the EGM (or personal gaming device) and are stored in at least one memory device of the EGM (or personal gaming device). In such "thick client" embodiments, the at least one processor of the EGM (or personal gaming device) executes the computerized instructions to control any games (or other suitable interfaces) displayed by the EGM (or personal gaming device).

In various embodiments in which the gaming system includes a plurality of EGMs (or personal gaming devices), one or more of the EGMs (or personal gaming devices) are thin client EGMs (or personal gaming devices) and one or more of the EGMs (or personal gaming devices) are thick client EGMs (or personal gaming devices). In other embodiments in which the gaming system includes one or more EGMs (or personal gaming devices), certain functions of one or more of the EGMs (or personal gaming devices) are implemented in a thin client environment, and certain other functions of one or more of the EGMs (or personal gaming devices) are implemented in a thick client environment. In one such embodiment in which the gaming system includes an EGM (or personal gaming device) and a server, computerized instructions for controlling any primary or base games displayed by the EGM (or personal gaming device) are communicated from the server to the EGM (or personal gaming device) in a thick client configuration, and computerized instructions for controlling any secondary or bonus games or other functions displayed by the EGM (or personal gaming device) are executed by the server in a thin client configuration.

In certain embodiments in which the gaming system includes: (a) an EGM (or personal gaming device) configured to communicate with a server through a data network; and/or (b) a plurality of EGMs (or personal gaming devices) configured to communicate with one another through a data network, the data network is a local area network (LAN) in which the EGMs (or personal gaming devices) are located substantially proximate to one another and/or the server. In one example, the EGMs (or personal gaming devices) and the server are located in a gaming establishment or a portion of a gaming establishment.

In other embodiments in which the gaming system includes: (a) an EGM (or personal gaming device) configured to communicate with a server through a data network; and/or (b) a plurality of EGMs (or personal gaming devices) configured to communicate with one another through a data network, the data network is a wide area network (WAN) in which one or more of the EGMs (or personal gaming devices) are not necessarily located substantially proximate to another one of the EGMs (or personal gaming devices) and/or the server. For example, one or more of the EGMs (or personal gaming devices) are located: (a) in an area of a gaming establishment different from an area of the gaming establishment in which the server is located; or (b) in a gaming establishment different from the gaming establishment in which the server is located. In another example, the server is not located within a gaming establishment in which the EGMs (or personal gaming devices) are located. In certain embodiments in which the data network is a WAN, the gaming system includes a server and an EGM (or personal gaming device) each located in a different gaming establishment in a same geographic area, such as a same city or a same state. Gaming systems in which the data network is a WAN are substantially identical to gaming systems in which the data network is a LAN, though the quantity of EGMs (or personal gaming devices) in such gaming systems may vary relative to one another.

In further embodiments in which the gaming system includes: (a) an EGM (or personal gaming device) configured to communicate with a server through a data network; and/or (b) a plurality of EGMs (or personal gaming devices) configured to communicate with one another through a data network, the data network is an internet (such as the Internet) or an intranet. In certain such embodiments, an Internet browser of the EGM (or personal gaming device) is usable to access an Internet game page from any location where an Internet connection is available. In one such embodiment, after the EGM (or personal gaming device) accesses the Internet game page, the server identifies a player before enabling that player to place any wagers on any plays of any wagering games. In one example, the server identifies the player by requiring a player account of the player to be logged into via an input of a unique username and password combination assigned to the player. The server may, however, identify the player in any other suitable manner, such as by validating a player tracking identification number associated with the player; by reading a player tracking card or other smart card inserted into a card reader (as described below); by validating a unique player identification number associated with the player by the server; or by identifying the EGM (or personal gaming device), such as by identifying the MAC address or the IP address of the Internet facilitator. In various embodiments, once the server identifies the player, the server enables placement of one or more wagers on one or more plays of one or more primary or base games and/or one or more secondary or bonus games, and displays those plays via the Internet browser of the EGM (or personal gaming device).

The server and the EGM (or personal gaming device) are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile Internet network), or any other suitable medium. The expansion in the quantity of computing devices and the quantity and speed of Internet connections in recent years increases opportunities for players to use a variety of EGMs (or personal gaming devices) to play games from an ever-increasing quantity of remote sites. Additionally, the enhanced bandwidth of digital wireless communications may render such technology suitable for some or all communications, particularly if such communications are encrypted. Higher data transmission speeds may be useful for enhancing the sophistication and response of the display and interaction with players.

Figure 3:
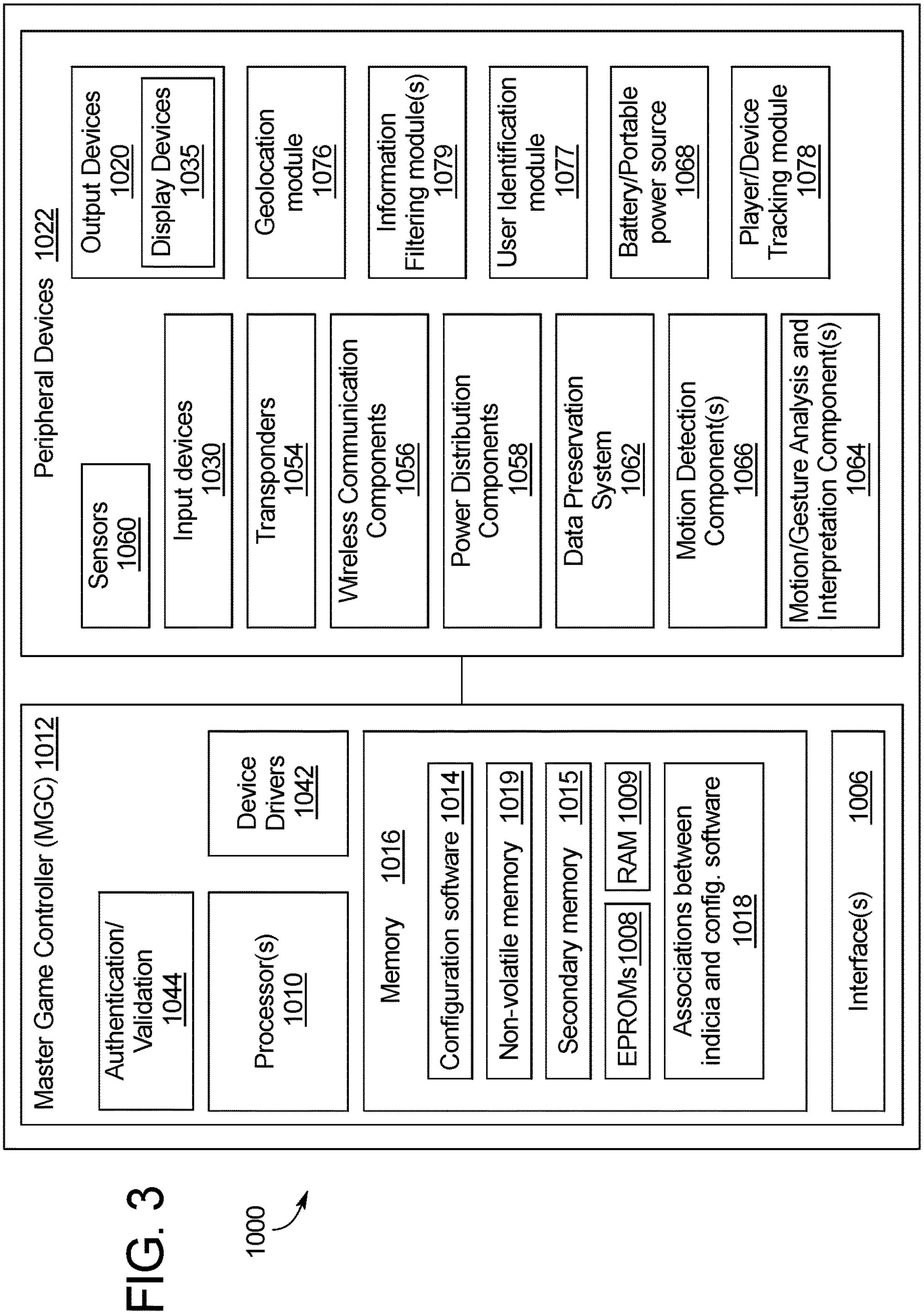
FIG. 3 is a schematic block diagram of one embodiment of an electronic configuration of an example gaming system of the present disclosure.
Figure 4A:
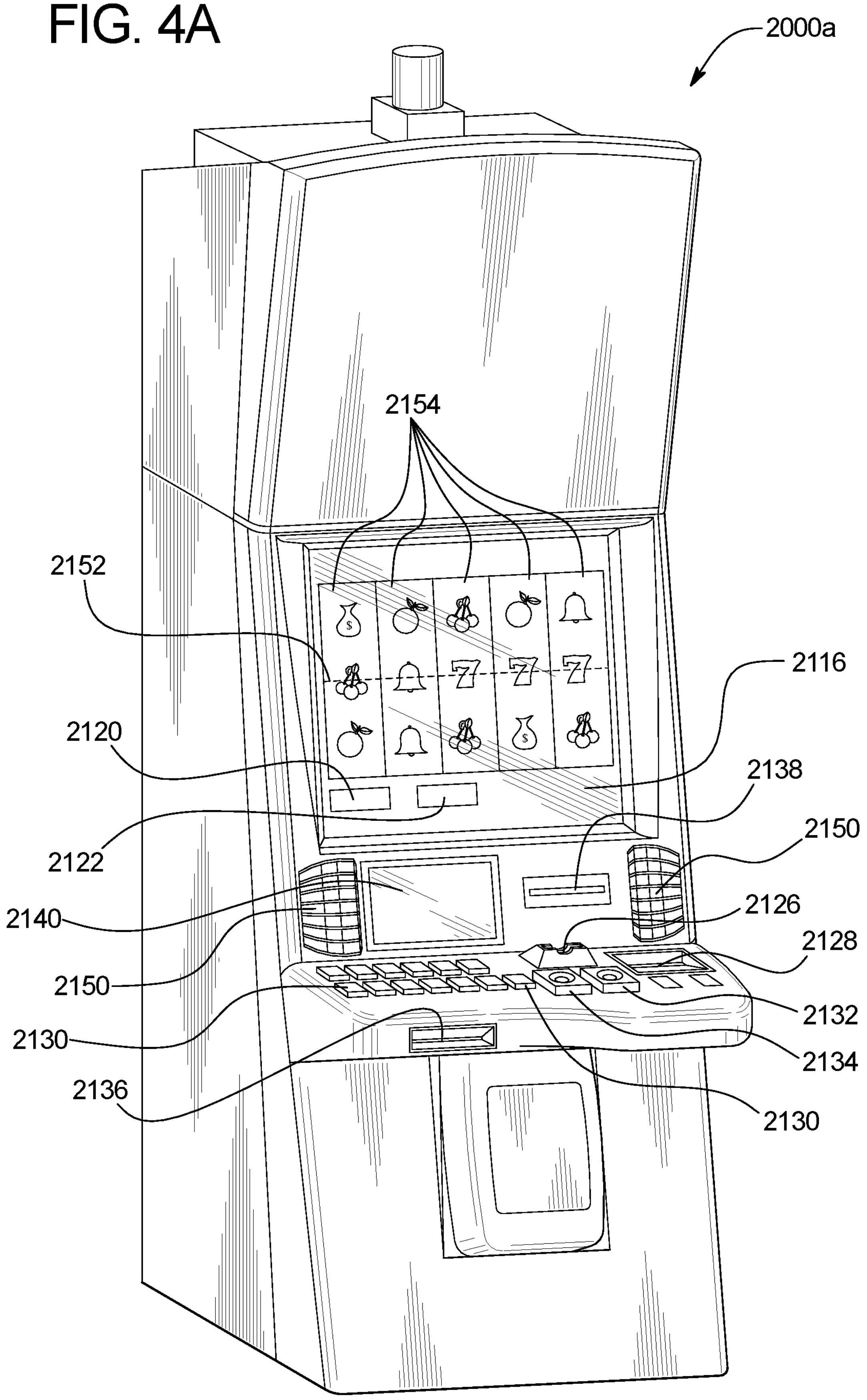
FIGS. 4A and 4B are perspective views of example alternative embodiments of the gaming system of the present disclosure.
Figure 4B:
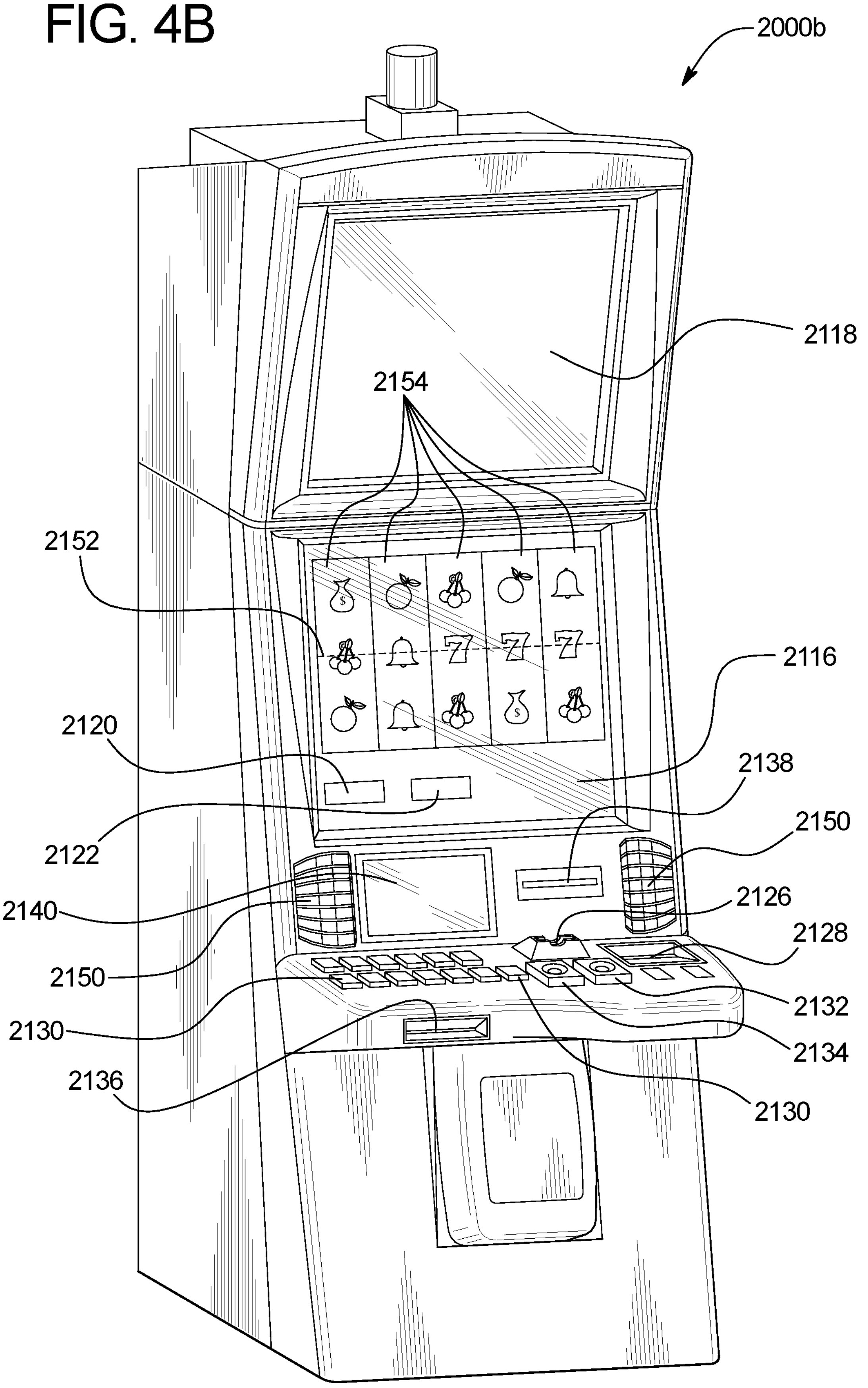
Figure 4C:
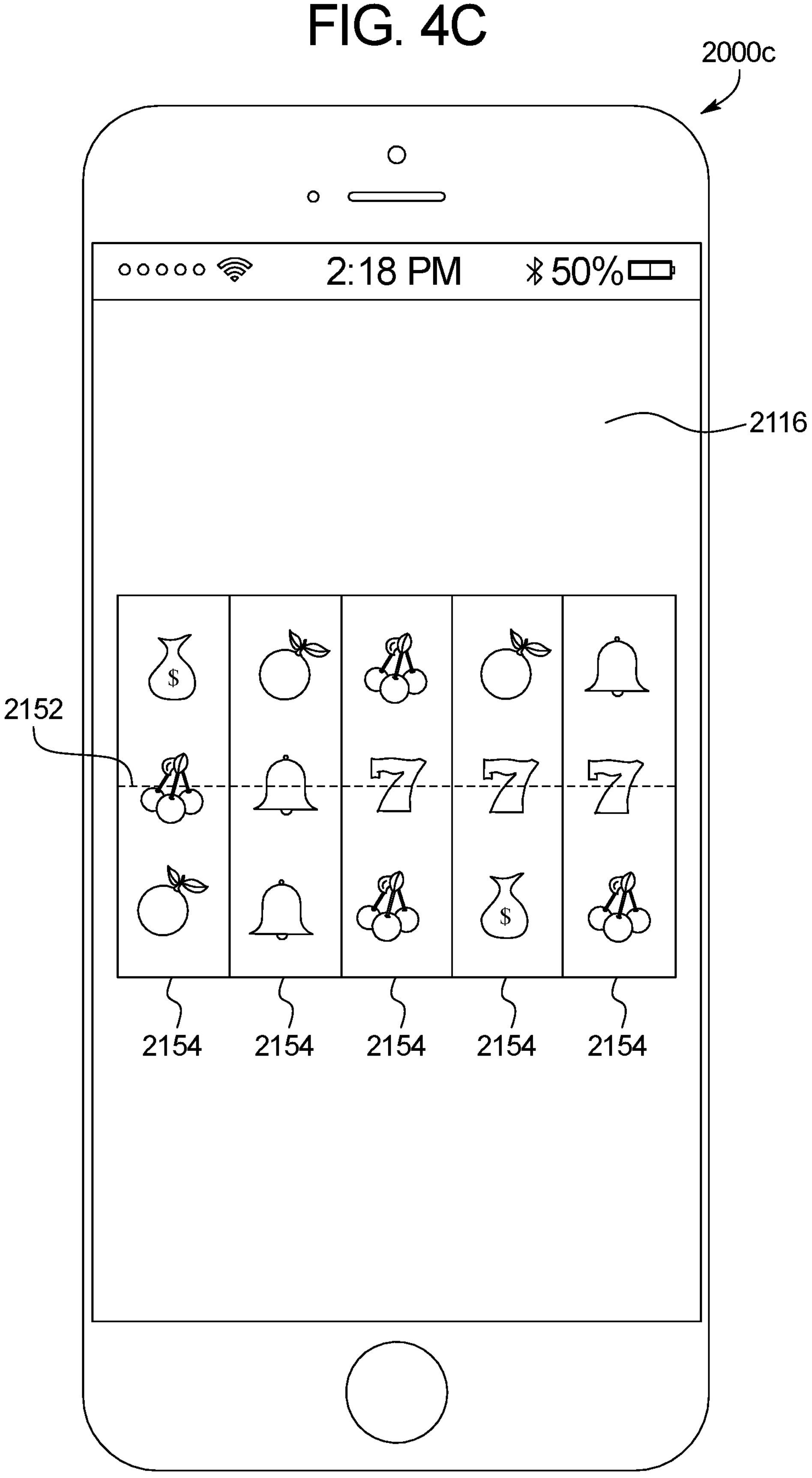
FIG. 4C is a front view of an example personal gaming device of the gaming system of the present disclosure.

FIG. 3 is a block diagram of an example EGM 1000 and FIGS. 4A and 4B include two different example EGMs 2000*a* and 2000*b*. The EGMs 1000, 2000*a*, and 2000*b* are merely example EGMs, and different EGMs may be implemented using different combinations of the components shown in the EGMs 1000, 2000*a*, and 2000*b*. Although the below refers to EGMs, in various embodiments personal gaming devices (such as personal gaming device 2000*c* of FIG. 4C) may include some or all of the below components.

In these embodiments, the EGM 1000 includes a master gaming controller 1012 configured to communicate with and to operate with a plurality of peripheral devices 1022.

The master gaming controller 1012 includes at least one processor 1010. The at least one processor 1010 is any suitable processing device or set of processing devices, such as a microprocessor, a microcontroller-based platform, a suitable integrated circuit, or one or more application-specific integrated circuits (ASICs), configured to execute software enabling various configuration and reconfiguration tasks, such as: (1) communicating with a remote source (such as a server that stores authentication information or game information) via a communication interface 1006 of the master gaming controller 1012; (2) converting signals read by an interface to a format corresponding to that used by software or memory of the EGM; (3) accessing memory to configure or reconfigure game parameters in the memory according to indicia read from the EGM; (4) communicating with interfaces and the peripheral devices 1022 (such as input/output devices); and/or (5) controlling the peripheral devices 1022. In certain embodiments, one or more components of the master gaming controller 1012 (such as the at least one processor 1010) reside within a housing of the EGM (described below), while in other embodiments at least one component of the master gaming controller 1012 resides outside of the housing of the EGM.

The master gaming controller 1012 also includes at least one memory device 1016, which includes: (1) volatile memory (e.g., RAM 1009, which can include non-volatile RAM, magnetic RAM, ferroelectric RAM, and any other suitable forms); (2) non-volatile memory 1019 (e.g., disk memory, FLASH memory, EPROMs, EEPROMs, memristor-based non-volatile solid-state memory, etc.); (3) unalterable memory (e.g., EPROMs 1008); (4) read-only memory; and/or (5) a secondary memory storage device 1015, such as a non-volatile memory device, configured to store gaming software related information (the gaming software related information and the memory may be used to store various audio files and games not currently being used and invoked in a configuration or reconfiguration). Any other suitable magnetic, optical, and/or semiconductor memory may operate in conjunction with the EGM of the present disclosure. In certain embodiments, the at least one memory device 1016 resides within the housing of the EGM (described below), while in other embodiments at least one component of the at least one memory device 1016 resides outside of the housing of the EGM. In these embodiments, any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

The at least one memory device 1016 is configured to store, for example: (1) configuration software 1014, such as all the parameters and settings for a game playable on the EGM; (2) associations 1018 between configuration indicia read from an EGM with one or more parameters and settings; (3) communication protocols configured to enable the at least one processor 1010 to communicate with the peripheral devices 1022; and/or (4) communication transport protocols (such as TCP/IP, USB, Firewire, IEEE1394, Bluetooth, IEEE 802.11x (IEEE 802.11 standards), hiperlan/2, HomeRF, etc.) configured to enable the EGM to communicate with local and non-local devices using such protocols. In one implementation, the master gaming controller 1012 communicates with other devices using a serial communication protocol. A few non-limiting examples of serial communication protocols that other devices, such as peripherals (e.g., a bill validator or a ticket printer), may use to communicate with the master game controller 1012 include USB, RS-232, and Netplex (a proprietary protocol developed by IGT).

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Computer program code for carrying out operations for aspects of the present disclosure may be written in any combination of one or more programming languages, including an object oriented programming language such as Java, Scala, Smalltalk, Eiffel, JADE, Emerald, C++, C #, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

In certain embodiments, the at least one memory device 1016 is configured to store program code and instructions executable by the at least one processor of the EGM to control the EGM. The at least one memory device 1016 of the EGM also stores other operating data, such as image data, event data, input data, random number generators (RNGs) or pseudo-RNGs, paytable data or information, and/or applicable game rules that relate to the play of one or more games on the EGM. In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a player uses such a removable memory device in an EGM to implement at least part of the present disclosure. In other embodiments, part or all of the program code and/or the operating data is downloaded to the at least one memory device of the EGM through any suitable data network described above (such as an Internet or intranet).

The at least one memory device 1016 also stores a plurality of device drivers 1042. Examples of different types of device drivers include device drivers for EGM components and device drivers for the peripheral components 1022. Typically, the device drivers 1042 utilize various communication protocols that enable communication with a particular physical device. The device driver abstracts the hardware implementation of that device. For example, a device driver may be written for each type of card reader that could potentially be connected to the EGM. Non-limiting examples of communication protocols used to implement the device drivers include Netplex, USB, Serial, Ethernet 175, Firewire, I/O debouncer, direct memory map, serial, PCI, parallel, RF, Bluetooth™, near-field communications (e.g., using near-field magnetics), 802.11 (WiFi), etc. In one embodiment, when one type of a particular device is exchanged for another type of the particular device, the at least one processor of the EGM loads the new device driver from the at least one memory device to enable communication with the new device. For instance, one type of card reader in the EGM can be replaced with a second different type of card reader when device drivers for both card readers are stored in the at least one memory device.

In certain embodiments, the software units stored in the at least one memory device 1016 can be upgraded as needed. For instance, when the at least one memory device 1016 is a hard drive, new games, new game options, new parameters, new settings for existing parameters, new settings for new parameters, new device drivers, and new communication protocols can be uploaded to the at least one memory device 1016 from the master game controller 1012 or from some other external device. As another example, when the at least one memory device 1016 includes a CD/DVD drive including a CD/DVD configured to store game options, parameters, and settings, the software stored in the at least one memory device 1016 can be upgraded by replacing a first CD/DVD with a second CD/DVD. In yet another example, when the at least one memory device 1016 uses flash memory 1019 or EPROM 1008 units configured to store games, game options, parameters, and settings, the software stored in the flash and/or EPROM memory units can be upgraded by replacing one or more memory units with new memory units that include the upgraded software. In another embodiment, one or more of the memory devices, such as the hard drive, may be employed in a game software download process from a remote software server.

In some embodiments, the at least one memory device 1016 also stores authentication and/or validation components 1044 configured to authenticate/validate specified EGM components and/or information, such as hardware components, software components, firmware components, peripheral device components, user input device components, information received from one or more user input devices, information stored in the at least one memory device 1016, etc.

In certain embodiments, the peripheral devices 1022 include several device interfaces, such as: (1) at least one output device 1020 including at least one display device 1035; (2) at least one input device 1030 (which may include contact and/or non-contact interfaces); (3) at least one transponder 1054; (4) at least one wireless communication component 1056; (5) at least one wired/wireless power distribution component 1058; (6) at least one sensor 1060; (7) at least one data preservation component 1062; (8) at least one motion/gesture analysis and interpretation component 1064; (9) at least one motion detection component 1066; (10) at least one portable power source 1068; (11) at least one geolocation module 1076; (12) at least one user identification module 1077; (13) at least one player/device tracking module 1078; and (14) at least one information filtering module 1079.

The at least one output device 1020 includes at least one display device 1035 configured to display any game(s) displayed by the EGM and any suitable information associated with such game(s). In certain embodiments, the display devices are connected to or mounted on a housing of the EGM (described below). In various embodiments, the display devices serve as digital glass configured to advertise certain games or other aspects of the gaming establishment in which the EGM is located. In various embodiments, the EGM includes one or more of the following display devices: (a) a central display device; (b) a player tracking display configured to display various information regarding a player's player tracking status (as described below); (c) a secondary or upper display device in addition to the central display device and the player tracking display; (d) a credit display configured to display a current quantity of credits, amount of cash, account balance, or the equivalent; and (e) a bet display configured to display an amount wagered for one or more plays of one or more games. The example EGM 2000*a* illustrated in FIG. 4A includes a central display device 2116, a player tracking display 2140, a credit display 2120, and a bet display 2122. The example EGM 2000*b* illustrated in FIG. 4B includes a central display device 2116, an upper display device 2118, a player tracking display 2140, a credit display 2120, and a bet display 2122.

In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. The display devices may be of any suitable sizes, shapes, and configurations.

The display devices of the EGM are configured to display one or more game and/or non-game images, symbols, and indicia. In certain embodiments, the display devices of the EGM are configured to display any suitable visual representation or exhibition of the movement of objects; dynamic lighting; video images; images of people, characters, places, things, and faces of cards; and the like. In certain embodiments, the display devices of the EGM are configured to display one or more video reels, one or more video wheels, and/or one or more video dice. In other embodiments, certain of the displayed images, symbols, and indicia are in mechanical form. That is, in these embodiments, the display device includes any electromechanical device, such as one or more rotatable wheels, one or more reels, and/or one or more dice, configured to display at least one or a plurality of game or other suitable images, symbols, or indicia.

In various embodiments, the at least one output device 1020 includes a payout device. In these embodiments, after the EGM receives an actuation of a cashout device (described below), the EGM causes the payout device to provide a payment to the player. In one embodiment, the payout device is one or more of: (a) a ticket printer and dispenser configured to print and dispense a ticket or credit slip associated with a monetary value, wherein the ticket or credit slip may be redeemed for its monetary value via a cashier, a kiosk, or other suitable redemption system; (b) a bill dispenser configured to dispense paper currency; (c) a coin dispenser configured to dispense coins or tokens (such as into a coin payout tray); and (d) any suitable combination thereof. The example EGMs 2000*a* and 2000*b* illustrated in FIGS. 4A and 4B each include a ticket printer and dispenser 2136.

In certain embodiments, rather than dispensing bills, coins, or a physical ticket having a monetary value to the player following receipt of an actuation of the cashout device, the payout device is configured to cause a payment to be provided to the player in the form of an electronic funds transfer, such as via a direct deposit into a bank account, a casino account, or a prepaid account of the player; via a transfer of funds onto an electronically recordable identification card or smart card of the player; or via sending a virtual ticket having a monetary value to an electronic device of the player.

While any credit balances, any wagers, any values, and any awards are described herein as amounts of monetary credits or currency, one or more of such credit balances, such wagers, such values, and such awards may be for non-monetary credits, promotional credits, of player tracking points or credits.

In certain embodiments, the at least one output device 1020 is a sound generating device controlled by one or more sound cards. In one such embodiment, the sound generating device includes one or more speakers or other sound generating hardware and/or software configured to generate sounds, such as by playing music for any games or by playing music for other modes of the EGM, such as an attract mode. The example EGMs 2000*a* and 2000*b* illustrated in FIGS. 4A and 4B each include a plurality of speakers 2150. In another such embodiment, the EGM provides dynamic sounds coupled with attractive multimedia images displayed on one or more of the display devices to provide an audio-visual representation or to otherwise display full-motion video with sound to attract players to the EGM. In certain embodiments, the EGM displays a sequence of audio and/or visual attraction messages during idle periods to attract potential players to the EGM. The videos may be customized to provide any appropriate information.

The at least one input device 1030 may include any suitable device that enables an input signal to be produced and received by the at least one processor 1010 of the EGM.

In one embodiment, the at least one input device 1030 includes a payment device configured to communicate with the at least one processor of the EGM to fund the EGM. In certain embodiments, the payment device includes one or more of: (a) a bill acceptor into which paper money is inserted to fund the EGM; (b) a ticket acceptor into which a ticket or a voucher is inserted to fund the EGM; (c) a coin slot into which coins or tokens are inserted to fund the EGM; (d) a reader or a validator for credit cards, debit cards, or credit slips into which a credit card, debit card, or credit slip is inserted to fund the EGM; (e) a player identification card reader into which a player identification card is inserted to fund the EGM; or (f) any suitable combination thereof. The example EGMs 2000*a* and 2000*b* illustrated in FIGS. 4A and 4B each include a combined bill and ticket acceptor 2128 and a coin slot 2126.

In one embodiment, the at least one input device 1030 includes a payment device configured to enable the EGM to be funded via an electronic funds transfer, such as a transfer of funds from a bank account. In another embodiment, the EGM includes a payment device configured to communicate with a mobile device of a player, such as a mobile phone, a radio frequency identification tag, or any other suitable wired or wireless device, to retrieve relevant information associated with that player to fund the EGM. When the EGM is funded, the at least one processor determines the amount of funds entered and displays the corresponding amount on a credit display or any other suitable display as described below.

In certain embodiments, the at least one input device 1030 includes at least one wagering or betting device. In various embodiments, the one or more wagering or betting devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). One such wagering or betting device is as a maximum wager or bet device that, when actuated, causes the EGM to place a maximum wager on a play of a game. Another such wagering or betting device is a repeat bet device that, when actuated, causes the EGM to place a wager that is equal to the previously-placed wager on a play of a game. A further such wagering or betting device is a bet one device that, when actuated, causes the EGM to increase the wager by one credit. Generally, upon actuation of one of the wagering or betting devices, the quantity of credits displayed in a credit meter (described below) decreases by the amount of credits wagered, while the quantity of credits displayed in a bet display (described below) increases by the amount of credits wagered.

In various embodiments, the at least one input device 1030 includes at least one game play activation device. In various embodiments, the one or more game play initiation devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). After a player appropriately funds the EGM and places a wager, the EGM activates the game play activation device to enable the player to actuate the game play activation device to initiate a play of a game on the EGM (or another suitable sequence of events associated with the EGM). After the EGM receives an actuation of the game play activation device, the EGM initiates the play of the game. The example EGMs 2000*a* and 2000*b* illustrated in FIGS. 4A and 4B each include a game play activation device in the form of a game play initiation button 2132. In other embodiments, the EGM begins game play automatically upon appropriate funding rather than upon utilization of the game play activation device.

In other embodiments, the at least one input device 1030 includes a cashout device. In various embodiments, the cashout device is: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). When the EGM receives an actuation of the cashout device from a player and the player has a positive (i.e., greater-than-zero) credit balance, the EGM initiates a payout associated with the player's credit balance. The example EGMs 2000*a* and 2000*b* illustrated in FIGS. 4A and 4B each include a cashout device in the form of a cashout button 2134.

In various embodiments, the at least one input device 1030 includes a plurality of buttons that are programmable by the EGM operator to, when actuated, cause the EGM to perform particular functions. For instance, such buttons may be hard keys, programmable soft keys, or icons icon displayed on a display device of the EGM (described below) that are actuatable via a touch screen of the EGM (described below) or via use of a suitable input device of the EGM (such as a mouse or a joystick). The example EGMs 2000*a* and 2000*b* illustrated in FIGS. 4A and 4B each include a plurality of such buttons 2130.

In certain embodiments, the at least one input device 1030 includes a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the EGM by touching the touch screen at the appropriate locations.

In embodiments including a player tracking system, as further described below, the at least one input device 1030 includes a card reader in communication with the at least one processor of the EGM. The example EGMs 2000*a* and 2000*b* illustrated in FIGS. 4A and 4B each include a card reader 2138. The card reader is configured to read a player identification card inserted into the card reader.

The at least one wireless communication component 1056 includes one or more communication interfaces having different architectures and utilizing a variety of protocols, such as (but not limited to) 802.11 (WiFi); 802.15 (including Bluetooth™); 802.16 (WiMax); 802.22; cellular standards such as CDMA, CDMA2000, and WCDMA; Radio Frequency (e.g., RFID); infrared; and Near Field Magnetic communication protocols. The at least one wireless communication component 1056 transmits electrical, electromagnetic, or optical signals that carry digital data streams or analog signals representing various types of information.

The at least one wired/wireless power distribution component 1058 includes components or devices that are configured to provide power to other devices. For example, in one embodiment, the at least one power distribution component 1058 includes a magnetic induction system that is configured to provide wireless power to one or more user input devices near the EGM. In one embodiment, a user input device docking region is provided, and includes a power distribution component that is configured to recharge a user input device without requiring metal-to-metal contact. In one embodiment, the at least one power distribution component 1058 is configured to distribute power to one or more internal components of the EGM, such as one or more rechargeable power sources (e.g., rechargeable batteries) located at the EGM.

In certain embodiments, the at least one sensor 1060 includes at least one of: optical sensors, pressure sensors, RF sensors, infrared sensors, image sensors, thermal sensors, and biometric sensors. The at least one sensor 1060 may be used for a variety of functions, such as: detecting movements and/or gestures of various objects within a predetermined proximity to the EGM; detecting the presence and/or identity of various persons (e.g., players, casino employees, etc.), devices (e.g., user input devices), and/or systems within a predetermined proximity to the EGM.

The at least one data preservation component 1062 is configured to detect or sense one or more events and/or conditions that, for example, may result in damage to the EGM and/or that may result in loss of information associated with the EGM. Additionally, the data preservation system 1062 may be operable to initiate one or more appropriate action(s) in response to the detection of such events/conditions.

The at least one motion/gesture analysis and interpretation component 1064 is configured to analyze and/or interpret information relating to detected player movements and/or gestures to determine appropriate player input information relating to the detected player movements and/or gestures. For example, in one embodiment, the at least one motion/gesture analysis and interpretation component 1064 is configured to perform one or more of the following functions: analyze the detected gross motion or gestures of a player; interpret the player's motion or gestures (e.g., in the context of a casino game being played) to identify instructions or input from the player; utilize the interpreted instructions/input to advance the game state; etc. In other embodiments, at least a portion of these additional functions may be implemented at a remote system or device.

The at least one portable power source 1068 enables the EGM to operate in a mobile environment. For example, in one embodiment, the EGM 300 includes one or more rechargeable batteries.

The at least one geolocation module 1076 is configured to acquire geolocation information from one or more remote sources and use the acquired geolocation information to determine information relating to a relative and/or absolute position of the EGM. For example, in one implementation, the at least one geolocation module 1076 is configured to receive GPS signal information for use in determining the position or location of the EGM. In another implementation, the at least one geolocation module 1076 is configured to receive multiple wireless signals from multiple remote devices (e.g., EGMs, servers, wireless access points, etc.) and use the signal information to compute position/location information relating to the position or location of the EGM.

The at least one user identification module 1077 is configured to determine the identity of the current user or current owner of the EGM. For example, in one embodiment, the current user is required to perform a login process at the EGM in order to access one or more features. Alternatively, the EGM is configured to automatically determine the identity of the current user based on one or more external signals, such as an RFID tag or badge worn by the current user and that provides a wireless signal to the EGM that is used to determine the identity of the current user. In at least one embodiment, various security features are incorporated into the EGM to prevent unauthorized users from accessing confidential or sensitive information.

The at least one information filtering module 1079 is configured to perform filtering (e.g., based on specified criteria) of selected information to be displayed at one or more displays 1035 of the EGM.

In various embodiments, the EGM includes a plurality of communication ports configured to enable the at least one processor of the EGM to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices.

As generally described above, in certain embodiments, such as the example EGMs 2000*a* and 2000*b* illustrated in FIGS. 4A and 4B, the EGM has a support structure, housing, or cabinet that provides support for a plurality of the input devices and the output devices of the EGM. Further, the EGM is configured such that a player may operate it while standing or sitting. In various embodiments, the EGM is positioned on a base or stand, or is configured as a pub-style tabletop game (not shown) that a player may operate typically while sitting. As illustrated by the different example EGMs 2000*a* and 2000*b* shown in FIGS. 4A and 4B, EGMs may have varying housing and display configurations.

In certain embodiments, the EGM is a device that has obtained approval from a regulatory gaming commission, and in other embodiments, the EGM is a device that has not obtained approval from a regulatory gaming commission.

The EGMs described above are merely three examples of different types of EGMs. Certain of these example EGMs may include one or more elements that may not be included in all gaming systems, and these example EGMs may not include one or more elements that are included in other gaming systems. For example, certain EGMs include a coin acceptor while others do not.

In various embodiments, an EGM may be implemented in one of a variety of different configurations. In various embodiments, the EGM may be implemented as one of: (a) a dedicated EGM in which computerized game programs executable by the EGM for controlling any primary or base games (referred to herein as "primary games") and/or any secondary or bonus games or other functions (referred to herein as "secondary games") displayed by the EGM are provided with the EGM before delivery to a gaming establishment or before being provided to a player; and (b) a changeable EGM in which computerized game programs executable by the EGM for controlling any primary games and/or secondary games displayed by the EGM are downloadable or otherwise transferred to the EGM through a data network or remote communication link; from a USB drive, flash memory card, or other suitable memory device; or in any other suitable manner after the EGM is physically located in a gaming establishment or after the EGM is provided to a player.

As generally explained above, in various embodiments in which the gaming system includes a server and a changeable EGM, the at least one memory device of the server stores different game programs and instructions executable by the at least one processor of the changeable EGM to control one or more primary games and/or secondary games displayed by the changeable EGM. More specifically, each such executable game program represents a different game or a different type of game that the at least one changeable EGM is configured to operate. In one example, certain of the game programs are executable by the changeable EGM to operate games having the same or substantially the same game play but different paytables. In different embodiments, each executable game program is associated with a primary game, a secondary game, or both. In certain embodiments, an executable game program is executable by the at least one processor of the at least one changeable EGM as a secondary game to be played simultaneously with a play of a primary game (which may be downloaded to or otherwise stored on the at least one changeable EGM), or vice versa.

In operation of such embodiments, the server is configured to communicate one or more of the stored executable game programs to the at least one processor of the changeable EGM. In different embodiments, a stored executable game program is communicated or delivered to the at least one processor of the changeable EGM by: (a) embedding the executable game program in a device or a component (such as a microchip to be inserted into the changeable EGM); (b) writing the executable game program onto a disc or other media; or (c) uploading or streaming the executable game program over a data network (such as a dedicated data network). After the executable game program is communicated from the server to the changeable EGM, the at least one processor of the changeable EGM executes the executable game program to enable the primary game and/or the secondary game associated with that executable game program to be played using the display device(s) and/or the input device(s) of the changeable EGM. That is, when an executable game program is communicated to the at least one processor of the changeable EGM, the at least one processor of the changeable EGM changes the game or the type of game that may be played using the changeable EGM.

In certain embodiments, the gaming system randomly determines any game outcome(s) (such as a win outcome) and/or award(s) (such as a quantity of credits to award for the win outcome) for a play of a primary game and/or a play of a secondary game based on probability data. In certain such embodiments, this random determination is provided through utilization of an RNG, such as a true RNG or a pseudo RNG, or any other suitable randomization process. In one such embodiment, each game outcome or award is associated with a probability, and the gaming system generates the game outcome(s) and/or the award(s) to be provided based on the associated probabilities. In these embodiments, since the gaming system generates game outcomes and/or awards randomly or based on one or more probability calculations, there is no certainty that the gaming system will ever provide any specific game outcome and/or award.

In certain embodiments, the gaming system maintains one or more predetermined pools or sets of predetermined game outcomes and/or awards. In certain such embodiments, upon generation or receipt of a game outcome and/or award request, the gaming system independently selects one of the predetermined game outcomes and/or awards from the one or more pools or sets. The gaming system flags or marks the selected game outcome and/or award as used. Once a game outcome or an award is flagged as used, it is prevented from further selection from its respective pool or set; that is, the gaming system does not select that game outcome or award upon another game outcome and/or award request. The gaming system provides the selected game outcome and/or award.

In certain embodiments, the gaming system determines a predetermined game outcome and/or award based on the results of a bingo, keno, or lottery game. In certain such embodiments, the gaming system utilizes one or more bingo, keno, or lottery games to determine the predetermined game outcome and/or award provided for a primary game and/or a secondary game. The gaming system is provided or associated with a bingo card. Each bingo card consists of a matrix or array of elements, wherein each element is designated with separate indicia. After a bingo card is provided, the gaming system randomly selects or draws a plurality of the elements. As each element is selected, a determination is made as to whether the selected element is present on the bingo card. If the selected element is present on the bingo card, that selected element on the provided bingo card is marked or flagged. This process of selecting elements and marking any selected elements on the provided bingo cards continues until one or more predetermined patterns are marked on one or more of the provided bingo cards. After one or more predetermined patterns are marked on one or more of the provided bingo cards, game outcome and/or award is determined based, at least in part, on the selected elements on the provided bingo cards.

In certain embodiments in which the gaming system includes a server and an EGM, the EGM is configured to communicate with the server for monitoring purposes only. In such embodiments, the EGM determines the game outcome(s) and/or award(s) to be provided in any of the manners described above, and the server monitors the activities and events occurring on the EGM. In one such embodiment, the gaming system includes a real-time or online accounting and gaming information system configured to communicate with the server. In this embodiment, the accounting and gaming information system includes: (a) a player database configured to store player profiles, (b) a player tracking module configured to track players (as described below), and (c) a credit system configured to provide automated transactions.

As noted above, in various embodiments, the gaming system includes one or more executable game programs executable by at least one processor of the gaming system to provide one or more primary games and one or more secondary games. The primary game(s) and the secondary game(s) may comprise any suitable games and/or wagering games, such as, but not limited to: electro-mechanical or video slot or spinning reel type games; video card games such as video draw poker, multi-hand video draw poker, other video poker games, video blackjack games, and video baccarat games; video keno games; video bingo games; and video selection games.

In certain embodiments in which the primary game is a slot or spinning reel type game, the gaming system includes one or more reels in either an electromechanical form with mechanical rotating reels or in a video form with simulated reels and movement thereof. Each reel displays a plurality of indicia or symbols, such as bells, hearts, fruits, numbers, letters, bars, or other images that typically correspond to a theme associated with the gaming system. In certain such embodiments, the gaming system includes one or more paylines associated with the reels. The example EGM **2000*b* shown in FIG. 4B includes a payline 2152 and a plurality of reels 2154**. In certain embodiments, one or more of the reels are independent reels or unisymbol reels. In such embodiments, each independent reel generates and displays one symbol.

In various embodiments, one or more of the paylines is horizontal, vertical, circular, diagonal, angled, or any suitable combination thereof. In other embodiments, each of one or more of the paylines is associated with a plurality of adjacent symbol display areas on a requisite number of adjacent reels. In one such embodiment, one or more paylines are formed between at least two symbol display areas that are adjacent to each other by either sharing a common side or sharing a common corner (i.e., such paylines are connected paylines). The gaming system enables a wager to be placed on one or more of such paylines to activate such paylines. In other embodiments in which one or more paylines are formed between at least two adjacent symbol display areas, the gaming system enables a wager to be placed on a plurality of symbol display areas, which activates those symbol display areas.

In various embodiments, the gaming system provides one or more awards after a spin of the reels when specified types and/or configurations of the indicia or symbols on the reels occur on an active payline or otherwise occur in a winning pattern, occur on the requisite number of adjacent reels, and/or occur in a scatter pay arrangement.

In certain embodiments, the gaming system employs a ways to win award determination. In these embodiments, any outcome to be provided is determined based on a number of associated symbols that are generated in active symbol display areas on the requisite number of adjacent reels (i.e., not on paylines passing through any displayed winning symbol combinations). If a winning symbol combination is generated on the reels, one award for that occurrence of the generated winning symbol combination is provided.

In various embodiments, the gaming system includes a progressive award. Typically, a progressive award includes an initial amount and an additional amount funded through a portion of each wager placed to initiate a play of a primary game. When one or more triggering events occurs, the gaming system provides at least a portion of the progressive award. After the gaming system provides the progressive award, an amount of the progressive award is reset to the initial amount and a portion of each subsequent wager is allocated to the next progressive award.

As generally noted above, in addition to providing winning credits or other awards for one or more plays of the primary game(s), in various embodiments the gaming system provides credits or other awards for one or more plays of one or more secondary games. The secondary game typically enables an award to be obtained addition to any award obtained through play of the primary game(s). The secondary game(s) typically produces a higher level of player excitement than the primary game(s) because the secondary game(s) provides a greater expectation of winning than the primary game(s) and is accompanied with more attractive or unusual features than the primary game(s). The secondary game(s) may be any type of suitable game, either similar to or completely different from the primary game.

In various embodiments, the gaming system automatically provides or initiates the secondary game upon the occurrence of a triggering event or the satisfaction of a qualifying condition. In other embodiments, the gaming system initiates the secondary game upon the occurrence of the triggering event or the satisfaction of the qualifying condition and upon receipt of an initiation input. In certain embodiments, the triggering event or qualifying condition is a selected outcome in the primary game(s) or a particular arrangement of one or more indicia on a display device for a play of the primary game(s), such as a "BONUS" symbol appearing on three adjacent reels along a payline following a spin of the reels for a play of the primary game. In other embodiments, the triggering event or qualifying condition occurs based on a certain amount of game play (such as number of games, number of credits, amount of time) being exceeded, or based on a specified number of points being earned during game play. Any suitable triggering event or qualifying condition or any suitable combination of a plurality of different triggering events or qualifying conditions may be employed.

In other embodiments, at least one processor of the gaming system randomly determines when to provide one or more plays of one or more secondary games. In one such embodiment, no apparent reason is provided for providing the secondary game. In this embodiment, qualifying for a secondary game is not triggered by the occurrence of an event in any primary game or based specifically on any of the plays of any primary game. That is, qualification is provided without any explanation or, alternatively, with a simple explanation. In another such embodiment, the gaming system determines qualification for a secondary game at least partially based on a game triggered or symbol triggered event, such as at least partially based on play of a primary game.

In various embodiments, after qualification for a secondary game has been determined, the secondary game participation may be enhanced through continued play on the primary game. Thus, in certain embodiments, for each secondary game qualifying event, such as a secondary game symbol, that is obtained, a given number of secondary game wagering points or credits is accumulated in a "secondary game meter" configured to accrue the secondary game wagering credits or entries toward eventual participation in the secondary game. In one such embodiment, the occurrence of multiple such secondary game qualifying events in the primary game results in an arithmetic or exponential increase in the number of secondary game wagering credits awarded. In another such embodiment, any extra secondary game wagering credits may be redeemed during the secondary game to extend play of the secondary game.

In certain embodiments, no separate entry fee or buy-in for the secondary game is required. That is, entry into the secondary game cannot be purchased; rather, in these embodiments entry must be won or earned through play of the primary game, thereby encouraging play of the primary game. In other embodiments, qualification for the secondary game is accomplished through a simple "buy-in." For example, qualification through other specified activities is unsuccessful, payment of a fee or placement of an additional wager "buys-in" to the secondary game. In certain embodiments, a separate side wager must be placed on the secondary game or a wager of a designated amount must be placed on the primary game to enable qualification for the secondary game. In these embodiments, the secondary game triggering event must occur and the side wager (or designated primary game wager amount) must have been placed for the secondary game to trigger.

In various embodiments in which the gaming system includes a plurality of EGMs, the EGMs are configured to communicate with one another to provide a group gaming environment. In certain such embodiments, the EGMs enable players of those EGMs to work in conjunction with one another, such as by enabling the players to play together as a team or group, to win one or more awards. In other such embodiments, the EGMs enable players of those EGMs to compete against one another for one or more awards. In one such embodiment, the EGMs enable the players of those EGMs to participate in one or more gaming tournaments for one or more awards.

In various embodiments, the gaming system includes one or more player tracking systems. Such player tracking systems enable operators of the gaming system (such as casinos or other gaming establishments) to recognize the value of customer loyalty by identifying frequent customers and rewarding them for their patronage. Such a player tracking system is configured to track a player's gaming activity. In one such embodiment, the player tracking system does so through the use of player tracking cards. In this embodiment, a player is issued a player identification card that has an encoded player identification number that uniquely identifies the player. When the player's playing tracking card is inserted into a card reader of the gaming system to begin a gaming session, the card reader reads the player identification number off the player tracking card to identify the player. The gaming system timely tracks any suitable information or data relating to the identified player's gaming session. The gaming system also timely tracks when the player tracking card is removed to conclude play for that gaming session. In another embodiment, rather than requiring insertion of a player tracking card into the card reader, the gaming system utilizes one or more portable devices, such as a mobile phone, a radio frequency identification tag, or any other suitable wireless device, to track when a gaming session begins and ends. In another embodiment, the gaming system utilizes any suitable biometric technology or ticket technology to track when a gaming session begins and ends.

In such embodiments, during one or more gaming sessions, the gaming system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In various embodiments, such tracked information and/or any suitable feature associated with the player tracking system is displayed on a player tracking display. In various embodiments, such tracked information and/or any suitable feature associated with the player tracking system is displayed via one or more service windows that are displayed on the central display device and/or the upper display device.

In various embodiments, the gaming system includes one or more servers configured to communicate with a personal gaming device—such as a smartphone, a tablet computer, a desktop computer, or a laptop computer—to enable web-based game play using the personal gaming device. In various embodiments, the player must first access a gaming website via an Internet browser of the personal gaming device or execute an application (commonly called an "app") installed on the personal gaming device before the player can use the personal gaming device to participate in web-based game play. In certain embodiments, the one or more servers and the personal gaming device operate in a thin-client environment. In these embodiments, the personal gaming device receives inputs via one or more input devices (such as a touch screen and/or physical buttons), the personal gaming device sends the received inputs to the one or more servers, the one or more servers make various determinations based on the inputs and determine content to be displayed (such as a randomly determined game outcome and corresponding award), the one or more servers send the content to the personal gaming device, and the personal gaming device displays the content.

In certain such embodiments, the one or more servers must identify the player before enabling game play on the personal gaming device (or, in some embodiments, before enabling monetary wager-based game play on the personal gaming device). In these embodiments, the player must identify herself to the one or more servers, such as by inputting the player's unique username and password combination, providing an input to a biometric sensor (e.g., a fingerprint sensor, a retinal sensor, a voice sensor, or a facial-recognition sensor), or providing any other suitable information.

Once identified, the one or more servers enable the player to establish an account balance from which the player can draw credits usable to wager on plays of a game. In certain embodiments, the one or more servers enable the player to initiate an electronic funds transfer to transfer funds from a bank account to the player's account balance. In other embodiments, the one or more servers enable the player to make a payment using the player's credit card, debit card, or other suitable device to add money to the player's account balance. In other embodiments, the one or more servers enable the player to add money to the player's account balance via a peer-to-peer type application, such as PayPal or Venmo. The one or more servers also enable the player to cash out the player's account balance (or part of it) in any suitable manner, such as via an electronic funds transfer, by initiating creation of a paper check that is mailed to the player, or by initiating printing of a voucher at a kiosk in a gaming establishment.

In certain embodiments, the one or more servers include a payment server that handles establishing and cashing out players' account balances and a separate game server configured to determine the outcome and any associated award for a play of a game. In these embodiments, the game server is configured to communicate with the personal gaming device and the payment device, and the personal gaming device and the payment device are not configured to directly communicate with one another. In these embodiments, when the game server receives data representing a request to start a play of a game at a desired wager, the game server sends data representing the desired wager to the payment server. The payment server determines whether the player's account balance can cover the desired wager (i.e., includes a monetary balance at least equal to the desired wager).

If the payment server determines that the player's account balance cannot cover the desired wager, the payment server notifies the game server, which then instructs the personal gaming device to display a suitable notification to the player that the player's account balance is too low to place the desired wager. If the payment server determines that the player's account balance can cover the desired wager, the payment server deducts the desired wager from the account balance and notifies the game server. The game server then determines an outcome and any associated award for the play of the game. The game server notifies the payment server of any nonzero award, and the payment server increases the player's account balance by the nonzero award. The game server sends data representing the outcome and any award to the personal gaming device, which displays the outcome and any award.

In certain embodiments, the one or more servers enable web-based game play using a personal gaming device only if the personal gaming device satisfies one or more jurisdictional requirements. In one embodiment, the one or more servers enable web-based game play using the personal gaming device only if the personal gaming device is located within a designated geographic area (such as within certain state or county lines or within the boundaries of a gaming establishment). In this embodiment, the geolocation module of the personal gaming device determines the location of the personal gaming device and sends the location to the one or more servers, which determine whether the personal gaming device is located within the designated geographic area. In various embodiments, the one or more servers enable non-monetary wager-based game play if the personal gaming device is located outside of the designated geographic area.

In various embodiments, the gaming system includes an EGM configured to communicate with a personal gaming device—such as a smartphone, a tablet computer, a desktop computer, or a laptop computer—to enable tethered mobile game play using the personal gaming device. Generally, in these embodiments, the EGM establishes communication with the personal gaming device and enables the player to play games on the EGM remotely via the personal gaming device. In certain embodiments, the gaming system includes a geo-fence system that enables tethered game play within a particular geographic area but not outside of that geographic area.

In certain embodiments, the gaming system is configured to communicate with a social network server that hosts or partially hosts a social networking website via a data network (such as the Internet) to integrate a player's gaming experience with the player's social networking account. This enables the gaming system to send certain information to the social network server that the social network server can use to create content (such as text, an image, and/or a video) and post it to the player's wall, newsfeed, or similar area of the social networking website accessible by the player's connections (and in certain cases the public) such that the player's connections can view that information. This also enables the gaming system to receive certain information from the social network server, such as the player's likes or dislikes or the player's list of connections. In certain embodiments, the gaming system enables the player to link the player's player account to the player's social networking account(s). This enables the gaming system to, once it identifies the player and initiates a gaming session (such as via the player logging in to a website (or an application) on the player's personal gaming device or via the player inserting the player's player tracking card into an EGM), link that gaming session to the player's social networking account(s). In other embodiments, the gaming system enables the player to link the player's social networking account(s) to individual gaming sessions when desired by providing the required login information.

For instance, in one embodiment, if a player wins a particular award (e.g., a progressive award or a jackpot award) or an award that exceeds a certain threshold (e.g., an award exceeding $1,000), the gaming system sends information about the award to the social network server to enable the server to create associated content (such as a screenshot of the outcome and associated award) and to post that content to the player's wall (or other suitable area) of the social networking website for the player's connections to see (and to entice them to play). In another embodiment, if a player joins a multiplayer game and there is another seat available, the gaming system sends that information to the social network sever to enable the server to create associated content (such as text indicating a vacancy for that particular game) and to post that content to the player's wall (or other suitable area) of the social networking website for the player's connections to see (and to entice them to fill the vacancy). In another embodiment, if the player consents, the gaming system sends advertisement information or offer information to the social network server to enable the social network server to create associated content (such as text or an image reflecting an advertisement and/or an offer) and to post that content to the player's wall (or other suitable area) of the social networking website for the player's connections to see. In another embodiment, the gaming system enables the player to recommend a game to the player's connections by posting a recommendation to the player's wall (or other suitable area) of the social networking website.

Certain of the gaming systems described herein, such as EGMs located in a casino or another gaming establishment, include certain components and/or are configured to operate in certain manners that differentiate these systems from general purpose computing devices, i.e., certain personal gaming devices such as desktop computers and laptop computers.

For instance, EGMs are highly regulated to ensure fairness and, in many cases, EGMs are configured to award monetary awards up to multiple millions of dollars. To satisfy security and regulatory requirements in a gaming environment, hardware and/or software architectures are implemented in EGMs that differ significantly from those of general purpose computing devices. For purposes of illustration, a description of EGMs relative to general purpose computing devices and some examples of these additional (or different) hardware and/or software architectures found in EGMs are described below.

At first glance, one might think that adapting general purpose computing device technologies to the gaming industry and EGMs would be a simple proposition because both general purpose computing devices and EGMs employ processors that control a variety of devices. However, due to at least: (1) the regulatory requirements placed on EGMs, (2) the harsh environment in which EGMs operate, (3) security requirements, and (4) fault tolerance requirements, adapting general purpose computing device technologies to EGMs can be quite difficult. Further, techniques and methods for solving a problem in the general purpose computing device industry, such as device compatibility and connectivity issues, might not be adequate in the gaming industry. For instance, a fault or a weakness tolerated in a general purpose computing device, such as security holes in software or frequent crashes, is not tolerated in an EGM because in an EGM these faults can lead to a direct loss of funds from the EGM, such as stolen cash or loss of revenue when the EGM is not operating properly or when the random outcome determination is manipulated.

Certain differences between general purpose computing devices and EGMs are described below. A first difference between EGMs and general purpose computing devices is that EGMs are state-based systems. A state-based system stores and maintains its current state in a non-volatile memory such that, in the event of a power failure or other malfunction, the state-based system can return to that state when the power is restored or the malfunction is remedied. For instance, for a state-based EGM, if the EGM displays an award for a game of chance but the power to the EGM fails before the EGM provides the award to the player, the EGM stores the pre-power failure state in a non-volatile memory, returns to that state upon restoration of power, and provides the award to the player. This requirement affects the software and hardware design on EGMs. General purpose computing devices are not state-based machines, and a majority of data is usually lost when a malfunction occurs on a general purpose computing device.

A second difference between EGMs and general purpose computing devices is that, for regulatory purposes, the software on the EGM utilized to operate the EGM has been designed to be static and monolithic to prevent cheating by the operator of the EGM. For instance, one solution that has been employed in the gaming industry to prevent cheating and to satisfy regulatory requirements has been to manufacture an EGM that can use a proprietary processor running instructions to provide the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used to operate a device during generation of the game of chance, can require burning a new EPROM approved by the gaming jurisdiction and reinstalling the new EPROM on the EGM in the presence of a gaming regulator. Regardless of whether the EPROM solution is used, to gain approval in most gaming jurisdictions, an EGM must demonstrate sufficient safeguards that prevent an operator or a player of an EGM from manipulating the EGM's hardware and software in a manner that gives him an unfair, and in some cases illegal, advantage.

A third difference between EGMs and general purpose computing devices is authentication—EGMs storing code are configured to authenticate the code to determine if the code is unaltered before executing the code. If the code has been altered, the EGM prevents the code from being executed. The code authentication requirements in the gaming industry affect both hardware and software designs on EGMs. Certain EGMs use hash functions to authenticate code. For instance, one EGM stores game program code, a hash function, and an authentication hash (which may be encrypted). Before executing the game program code, the EGM hashes the game program code using the hash function to obtain a result hash and compares the result hash to the authentication hash. If the result hash matches the authentication hash, the EGM determines that the game program code is valid and executes the game program code. If the result hash does not match the authentication hash, the EGM determines that the game program code has been altered (i.e., may have been tampered with) and prevents execution of the game program code.

A fourth difference between EGMs and general purpose computing devices is that EGMs have unique peripheral device requirements that differ from those of a general purpose computing device, such as peripheral device security requirements not usually addressed by general purpose computing devices. For instance, monetary devices, such as coin dispensers, bill validators, and ticket printers and computing devices that are used to govern the input and output of cash or other items having monetary value (such as tickets) to and from an EGM have security requirements that are not typically addressed in general purpose computing devices. Therefore, many general purpose computing device techniques and methods developed to facilitate device connectivity and device compatibility do not address the emphasis placed on security in the gaming industry.

To address some of the issues described above, a number of hardware/software components and architectures are utilized in EGMs that are not typically found in general purpose computing devices. These hardware/software components and architectures, as described below in more detail, include but are not limited to watchdog timers, voltage monitoring systems, state-based software architecture and supporting hardware, specialized communication interfaces, security monitoring, and trusted memory.

Certain EGMs use a watchdog timer to provide a software failure detection mechanism. In a normally-operating EGM, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits include a loadable timeout counter register to enable the operating software to set the timeout interval within a certain range of time. A differentiating feature of some circuits is that the operating software cannot completely disable the function of the watchdog timer. In other words, the watchdog timer always functions from the time power is applied to the board.

Certain EGMs use several power supply voltages to operate portions of the computer circuitry. These can be generated in a central power supply or locally on the computer board. If any of these voltages falls out of the tolerance limits of the circuitry they power, unpredictable operation of the EGM may result. Though most modern general purpose computing devices include voltage monitoring circuitry, these types of circuits only report voltage status to the operating software. Out of tolerance voltages can cause software malfunction, creating a potential uncontrolled condition in the general purpose computing device. Certain EGMs have power supplies with relatively tighter voltage margins than that required by the operating circuitry. In addition, the voltage monitoring circuitry implemented in certain EGMs typically has two thresholds of control. The first threshold generates a software event that can be detected by the operating software and an error condition then generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the EGM.

As described above, certain EGMs are state-based machines. Different functions of the game provided by the EGM (e.g., bet, play, result, points in the graphical presentation, etc.) may be defined as a state. When the EGM moves a game from one state to another, the EGM stores critical data regarding the game software in a custom non-volatile memory subsystem. This ensures that the player's wager and credits are preserved and to minimize potential disputes in the event of a malfunction on the EGM. In general, the EGM does not advance from a first state to a second state until critical information that enables the first state to be reconstructed has been stored. This feature enables the EGM to recover operation to the current state of play in the event of a malfunction, loss of power, etc. that occurred just before the malfunction. In at least one embodiment, the EGM is configured to store such critical information using atomic transactions.

Generally, an atomic operation in computer science refers to a set of operations that can be combined so that they appear to the rest of the system to be a single operation with only two possible outcomes: success or failure. As related to data storage, an atomic transaction may be characterized as series of database operations which either all occur, or all do not occur. A guarantee of atomicity prevents updates to the database occurring only partially, which can result in data corruption.

To ensure the success of atomic transactions relating to critical information to be stored in the EGM memory before a failure event (e.g., malfunction, loss of power, etc.), memory that includes one or more of the following criteria be used: direct memory access capability; data read/write capability which meets or exceeds minimum read/write access characteristics (such as at least 5.08 Mbytes/sec (Read) and/or at least 38.0 Mbytes/sec (Write)). Memory devices that meet or exceed the above criteria may be referred to as "fault-tolerant" memory devices.

Typically, battery-backed RAM devices may be configured to function as fault-tolerant devices according to the above criteria, whereas flash RAM and/or disk drive memory are typically not configurable to function as fault-tolerant devices according to the above criteria. Accordingly, battery-backed RAM devices are typically used to preserve EGM critical data, although other types of non-volatile memory devices may be employed. These memory devices are typically not used in typical general purpose computing devices.

Thus, in at least one embodiment, the EGM is configured to store critical information in fault-tolerant memory (e.g., battery-backed RAM devices) using atomic transactions. Further, in at least one embodiment, the fault-tolerant memory is able to successfully complete all desired atomic transactions (e.g., relating to the storage of EGM critical information) within a time period of 200 milliseconds or less. In at least one embodiment, the time period of 200 milliseconds represents a maximum amount of time for which sufficient power may be available to the various EGM components after a power outage event has occurred at the EGM.

As described previously, the EGM may not advance from a first state to a second state until critical information that enables the first state to be reconstructed has been atomically stored. After the state of the EGM is restored during the play of a game of chance, game play may resume and the game may be completed in a manner that is no different than if the malfunction had not occurred. Thus, for example, when a malfunction occurs during a game of chance, the EGM may be restored to a state in the game of chance just before when the malfunction occurred. The restored state may include metering information and graphical information that was displayed on the EGM in the state before the malfunction. For example, when the malfunction occurs during the play of a card game after the cards have been dealt, the EGM may be restored with the cards that were previously displayed as part of the card game. As another example, a bonus game may be triggered during the play of a game of chance in which a player is required to make a number of selections on a video display screen. When a malfunction has occurred after the player has made one or more selections, the EGM may be restored to a state that shows the graphical presentation just before the malfunction including an indication of selections that have already been made by the player. In general, the EGM may be restored to any state in a plurality of states that occur in the game of chance that occurs while the game of chance is played or to states that occur between the play of a game of chance.

Game history information regarding previous games played such as an amount wagered, the outcome of the game, and the like may also be stored in a non-volatile memory device. The information stored in the non-volatile memory may be detailed enough to reconstruct a portion of the graphical presentation that was previously presented on the EGM and the state of the EGM (e.g., credits) at the time the game of chance was played. The game history information may be utilized in the event of a dispute. For example, a player may decide that in a previous game of chance that they did not receive credit for an award that they believed they won. The game history information may be used to reconstruct the state of the EGM before, during, and/or after the disputed game to demonstrate whether the player was correct or not in the player's assertion.

Another feature of EGMs is that they often include unique interfaces, including serial interfaces, to connect to specific subsystems internal and external to the EGM. The serial devices may have electrical interface requirements that differ from the "standard" EIA serial interfaces provided by general purpose computing devices. These interfaces may include, for example, Fiber Optic Serial, optically coupled serial interfaces, current loop style serial interfaces, etc. In addition, to conserve serial interfaces internally in the EGM, serial devices may be connected in a shared, daisy-chain fashion in which multiple peripheral devices are connected to a single serial channel.

The serial interfaces may be used to transmit information using communication protocols that are unique to the gaming industry. For example, IGT's Netplex is a proprietary communication protocol used for serial communication between EGMs. As another example, SAS is a communication protocol used to transmit information, such as metering information, from an EGM to a remote device. Often SAS is used in conjunction with a player tracking system.

Certain EGMs may alternatively be treated as peripheral devices to a casino communication controller and connected in a shared daisy chain fashion to a single serial interface. In both cases, the peripheral devices are assigned device addresses. If so, the serial controller circuitry must implement a method to generate or detect unique device addresses. General purpose computing device serial ports are not able to do this.

Security monitoring circuits detect intrusion into an EGM by monitoring security switches attached to access doors in the EGM cabinet. Access violations result in suspension of game play and can trigger additional security operations to preserve the current state of game play. These circuits also function when power is off by use of a battery backup. In power-off operation, these circuits continue to monitor the access doors of the EGM. When power is restored, the EGM can determine whether any security violations occurred while power was off, e.g., via software for reading status registers. This can trigger event log entries and further data authentication operations by the EGM software.

Trusted memory devices and/or trusted memory sources are included in an EGM to ensure the authenticity of the software that may be stored on less secure memory subsystems, such as mass storage devices. Trusted memory devices and controlling circuitry are typically designed to not enable modification of the code and data stored in the memory device while the memory device is installed in the EGM. The code and data stored in these devices may include authentication algorithms, random number generators, authentication keys, operating system kernels, etc. The purpose of these trusted memory devices is to provide gaming regulatory authorities a root trusted authority within the computing environment of the EGM that can be tracked and verified as original. This may be accomplished via removal of the trusted memory device from the EGM computer and verification of the secure memory device contents is a separate third party verification device. Once the trusted memory device is verified as authentic, and based on the approval of the verification algorithms included in the trusted device, the EGM is enabled to verify the authenticity of additional code and data that may be located in the gaming computer assembly, such as code and data stored on hard disk drives.

In at least one embodiment, at least a portion of the trusted memory devices/sources may correspond to memory that cannot easily be altered (e.g., "unalterable memory") such as EPROMS, PROMS, Bios, Extended Bios, and/or other memory sources that are able to be configured, verified, and/or authenticated (e.g., for authenticity) in a secure and controlled manner.

According to one embodiment, when a trusted information source is in communication with a remote device via a network, the remote device may employ a verification scheme to verify the identity of the trusted information source. For example, the trusted information source and the remote device may exchange information using public and private encryption keys to verify each other's identities. In another embodiment, the remote device and the trusted information source may engage in methods using zero knowledge proofs to authenticate each of their respective identities.

EGMs storing trusted information may utilize apparatuses or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected.

Mass storage devices used in a general purpose computing devices typically enable code and data to be read from and written to the mass storage device. In a gaming environment, modification of the gaming code stored on a mass storage device is strictly controlled and would only be enabled under specific maintenance type events with electronic and physical enablers required. Though this level of security could be provided by software, EGMs that include mass storage devices include hardware level mass storage data protection circuitry that operates at the circuit level to monitor attempts to modify data on the mass storage device and will generate both software and hardware error triggers should a data modification be attempted without the proper electronic and physical enablers being present.

It should be appreciated that the terminology used herein is for the purpose of describing particular aspects only and is not intended to be limiting of the disclosure. For example, the singular forms "a", "an" and "the" are intended to include the plural forms as well, unless the context clearly indicates otherwise. In another example, the terms "including" and "comprising" and variations thereof, when used in this specification, specify the presence of stated features, steps, operations, elements, and/or components, but do not preclude the presence or addition of one or more other features, steps, operations, elements, components, and/or groups thereof. Additionally, a listing of items does not imply that any or all of the items are mutually exclusive nor does a listing of items imply that any or all of the items are collectively exhaustive of anything or in a particular order, unless expressly specified otherwise. Moreover, as used herein, the term "and/or" includes any and all combinations of one or more of the associated listed items. It should be further appreciated that headings of sections provided in this document and the title are for convenience only, and are not to be taken as limiting the disclosure in any way. Furthermore, unless expressly specified otherwise, devices that are in communication with each other need not be in continuous communication with each other and may communicate directly or indirectly through one or more intermediaries.

Various changes and modifications to the present embodiments described herein will be apparent to those skilled in the art. For example, a description of an embodiment with several components in communication with each other does not imply that all such components are required, or that each of the disclosed components must communicate with every other component. On the contrary a variety of optional components are described to illustrate the wide variety of possible embodiments of the present disclosure. As such, these changes and modifications can be made without departing from the spirit and scope of the present subject matter and without diminishing its intended technical scope. It is therefore intended that such changes and modifications be covered by the appended claims.

The invention is claimed as follows:

1. A gaming system comprising:

a processor; and a memory device that stores a plurality of instructions that, when executed by the processor, cause the processor to:

cause a display, by a display device, of a first progressive award comprising a first quantity of occurrences of a designated symbol, the first quantity of occurrences of the designated symbol comprising a first occurrence of the designated symbol associated with a first additional award, and responsive to an occurrence of a first progressive award triggering event associated with a play of a first game:

determine a first total award based on a guarantee of a generation, during the play of the first game, of at least the first quantity of occurrences of the designated symbol, and the first additional award, and cause a display, by the display device, of the first total award.

2. The gaming system of claim 1, wherein the memory device stores a plurality of further instructions that, when executed by the processor, cause the processor to cause a display, by the display device, of a second progressive award comprising a second quantity of occurrences of the designated symbol, the second quantity of occurrences of the designated symbol comprising a second occurrence of the designated symbol associated with a second additional award.

3. The gaming system of claim 2, wherein the memory device stores a plurality of further instructions that, when executed by the processor responsive to an occurrence of a second progressive award triggering event, cause the processor to:

trigger a plurality of plays of a second game different from the first game, determine a second total award based on a guarantee of a generation, over the plurality of plays of the second game, of at least the second quantity of occurrences of the designated symbol, and the second additional award, and cause a display, by the display device, of the second total award.

4. The gaming system of claim 3, wherein the play of the first game comprises a wagering game and the plurality of plays of the second game comprise a free spin sequence.

5. The gaming system of claim 1, wherein the designated symbol comprises a wild symbol.

6. The gaming system of claim 5, wherein the first additional award comprises a value.

7. The gaming system of claim 1, wherein the memory device stores a plurality of further instructions that, when executed by the processor responsive to a generation of a first designated symbol during the play of the first game prior to the occurrence of the first progressive award triggering event, cause the processor to increase the first quantity of occurrences of the designated symbol.

8. The gaming system of claim 1, wherein the determination of the first total award is based on the designated symbol associated with the first additional award displayed at a first symbol display position and the designated symbol associated with a second additional award displayed at the first symbol display position.

9. The gaming system of claim 8, wherein the first total award comprises at least a sum of the first additional award and the second additional award.

10. A gaming system comprising:

a processor; and a memory device that stores a plurality of instructions that, when executed by the processor, cause the processor to:

cause a display, by a display device, of a progressive award comprising a first quantity of guaranteed occurrences of a designated symbol, at least one occurrence of the first quantity of guaranteed occurrences of the designated symbol being associated with a first additional award, responsive to an occurrence of a triggering event, cause a display, by the display device, of a first plurality of plays of a game, wherein at least the first quantity of guaranteed occurrences of the designated symbol is guaranteed to be generated over the first plurality of plays of the game, and a first total award over the first plurality of plays of the game comprises the first additional award, and following the first plurality of plays of the game:

reset the first quantity of guaranteed occurrences of the designated symbol to a reset quantity of guaranteed occurrences of the designated symbol, at least one occurrence of the reset quantity of guaranteed occurrences of the designated symbol being associated with a second additional award, and cause a display, by the display device, of the progressive award comprising the reset quantity of guaranteed occurrences of the designated symbol, wherein at least the reset quantity of guaranteed occurrences of the designated symbol is guaranteed to be generated over a second plurality of plays of the game, and a second total award over the second plurality of plays of the game comprises the second additional award.

11. The gaming system of claim 10, wherein the designated symbol comprises a wild symbol.

12. The gaming system of claim 11, wherein at least the first additional award comprises a value.

13. The gaming system of claim 10, wherein the memory device stores a plurality of further instructions that, when executed by the processor responsive to a generation of the designated symbol prior to the occurrence of the triggering event, cause the processor to increase the first quantity of guaranteed occurrences of the designated symbol of the progressive award.

14. The gaming system of claim 10, wherein the game comprises a reel game associated with a plurality of symbol display positions and the designated symbol is associated with different probabilities of being generated at the different symbol display positions over the first plurality of plays of the game.

15. The gaming system of claim 10, wherein the game comprises a reel game associated with a plurality of symbol display positions and different additional awards are associated with different probabilities of being generated at the different symbol display positions over the first plurality of plays of the game.

16. A gaming system comprising:

a processor; and a memory device that stores a plurality of instructions that, when executed by the processor, cause the processor to:

for a play of a game associated with a triggering of a progressive award comprising a quantity of guaranteed occurrences of a designated symbol, the quantity of guaranteed occurrences comprising a first guaranteed occurrence of the designated symbol being associated with a first additional award, and a second guaranteed occurrence of the designated symbol being associated with a second additional award:

cause a display, by a display device, of a plurality of symbols at a plurality of symbol display positions, the plurality of symbols comprising at least the quantity of guaranteed occurrences of the designated symbols, and cause a display, by the display device, of a total award based, at least in part, at least one of the first additional award and the second additional award.

17. The gaming system of claim 16, wherein responsive to the first guaranteed occurrence of the designated symbol displayed at a first symbol display position of the plurality of symbol display positions and the second guaranteed occurrence of the designated symbol displayed at a second symbol display position of the plurality of symbol display positions, the total award is based on the first additional award and the second additional award.

18. The gaming system of claim 17, wherein the first symbol display position and the second symbol display position are a same symbol display position.

19. The gaming system of claim 16, wherein the designated symbol comprises a wild symbol and the first additional award comprises an award value.

20. The gaming system of claim 16, wherein the total award is based, at least in part, on any formed winning combinations of the displayed plurality of symbols.

* * * * *